(12) United States Patent
Juzkow et al.

(10) Patent No.: US 10,538,437 B1
(45) Date of Patent: Jan. 21, 2020

(54) LIQUID TREATMENT USING CAPACITIVE SYSTEMS

(71) Applicant: Iontensity, LLC, Livermore, CA (US)

(72) Inventors: Marc Juzkow, Livermore, CA (US);
Forest H. Bishop, Livermore, CA (US);
Perry Juric, Dublin, CA (US);
Francisco Madulid, Castro Valley, CA (US)

(73) Assignee: IONTENSITY, LLC, Livermore, CA (US)

( * ) Notice: Subject to any disclaimer, the term of this patent is extended or adjusted under 35 U.S.C. 154(b) by 420 days.

(21) Appl. No.: 15/411,897

(22) Filed: Jan. 20, 2017

Related U.S. Application Data

(60) Provisional application No. 62/280,760, filed on Jan. 20, 2016.

(51) Int. Cl.
*C02F 1/469* (2006.01)
*C02F 1/461* (2006.01)
(Continued)

(52) U.S. Cl.
CPC ........ *C02F 1/4691* (2013.01); *C02F 1/46109* (2013.01); *C02F 2001/46138* (2013.01);
(Continued)

(58) Field of Classification Search
CPC ............... C02F 1/4691; C02F 1/46109; C02F 2001/46138; C02F 2001/46152;
(Continued)

(56) References Cited

U.S. PATENT DOCUMENTS

2018/0009681 A1* 1/2018 Cam ................. B01D 17/0211

OTHER PUBLICATIONS

Jung, et al. "Capacitive deionization characteristics of nanostructured carbon aerogel electrodes synthesized via ambient drying," Desalination, 216(1-3): p. 377-385, Oct. (Year: 2007).*

(Continued)

*Primary Examiner* — J. Christopher Ball
(74) *Attorney, Agent, or Firm* — Kwan & Olynick LLP

(57) ABSTRACT

Provided are liquid treatment systems (e.g., water desalinization systems, water softening systems, water purification systems), system components, methods of fabricating components and systems, and methods of operating the systems. A liquid treatment system may include a first electrode and a second electrode. During operation of the system, the treated liquid may flow between and, in some embodiments, through these electrodes and release contaminants that are electrolytically deposited on these electrodes. At least one electrode may include a non-conductive support and an active structure mechanically supported by the non-conductive support and a conductive assist structure disposed between the active structure and the non-conductive support. The non-conductive support may be a polymer film, such as polyethylene terephthalate (PET) film. Unlike conventional metallic substrates, the non-conductive support is more resistant to corrosion. Furthermore, there are risk of electrical shorts and the non-conductive support may be in direct contact with various other components of the system.

17 Claims, 17 Drawing Sheets

(51) Int. Cl.
*C02F 103/08* (2006.01)
*C02F 103/34* (2006.01)
*C02F 103/36* (2006.01)
*C02F 101/20* (2006.01)
*C02F 101/10* (2006.01)
*C02F 101/22* (2006.01)
*C02F 101/12* (2006.01)

(52) U.S. Cl.
CPC .............. *C02F 2001/46152* (2013.01); *C02F 2101/101* (2013.01); *C02F 2101/103* (2013.01); *C02F 2101/12* (2013.01); *C02F 2101/203* (2013.01); *C02F 2101/22* (2013.01); *C02F 2103/08* (2013.01); *C02F 2103/346* (2013.01); *C02F 2103/365* (2013.01); *C02F 2201/46115* (2013.01)

(58) Field of Classification Search
CPC ...... C02F 2201/46115; C02F 2101/101; C02F 2101/12; C02F 2101/22; C02F 2101/103; C02F 2101/203; C02F 2103/365; C02F 2103/346; C02F 2103/08
See application file for complete search history.

(56) References Cited

OTHER PUBLICATIONS

Technical data for Titanium; https://periodictable.com/Elements/022/data.htm; accessed on May 7, (Year: 2019).*

Webpage: Eddy Current Technology, Inc. "Conductivity of Metals Sorted by Resistivity", http://eddy-current.com/conductivity-of-metals-sorted-by-resistivity/; downloaded on Jun. 25, (Year: 2019).*

* cited by examiner

LIQUID TREATMENT USING CAPACITIVE SYSTEMS

CROSS-REFERENCE TO RELATED APPLICATIONS

This application claims the benefit under 35 U.S.C. § 119(e) of U.S. Provisional Patent Application 62/280,760, entitled: "LIQUID TREATMENT USING CAPACITIVE SYSTEMS" filed on Jan. 20, 2016, which is incorporated herein by reference in its entirety for all purposes.

BACKGROUND

Liquid treatment or, more specifically, water desalination is an important process to obtain usable water. Current methods of desalination include reverse osmosis (RO) and several variations of distillation, all of which are very energy and capital intensive. Another desalination technique is capacitive deionization (CDI), which involves passing water with high total dissolved solids (TDS) between two electrodes, each with high surface area carbon, also known as activated carbon, similar to a supercapacitor. Examples of TDS includes various monovalent species (e.g., sodium chloride (NaCl) and lithium chloride (LiCl)) and divalent species (e.g., calcium carbonate ($CaCO_3$) and magnesium carbonate ($MgCO_3$)). When the voltage potential is applied to the electrodes, positive ions are attracted to the cathode while negative ions are attracted to the anode. The processed water has a lower salt concentration than the incoming feed water. The ions removed from the water and collected on the surfaces of the electrodes can be later removed from these surfaces by discharging the electrodes into another batch of water, which is dispensed into a separate outlet from the fresh effluent. This electrode cleaning process is known as regeneration. Typically, the salt concentration is many times higher in the regeneration effluent than in the incoming saline water as the volume throughput is set lower than during the desalination process. This desalination method has very low operating costs as the energy used to charge the electrodes during the ion extraction step is recovered during the discharge process of the regeneration step. However, current systems suffer from corrosion of the current collectors used for electrodes.

SUMMARY

Provided are liquid treatment systems (e.g., water desalinization systems), system components (e.g., electrodes and components of these electrodes), arrangements of system components, methods of fabricating components and systems, and methods of operating the systems. A liquid treatment system may include a first electrode and a second electrode. During operation of the system, the untreated liquid may flow between and, in some embodiments, through these electrodes and release contaminants that are electrolytically deposited on these electrodes. At least one electrode may include a non-conductive support and an active structure mechanically supported by the non-conductive support. The non-conductive support may be a polymer film, such as polyethylene terephthalate (PET) film. Unlike conventional metallic substrates, the non-conductive support is more resistant to corrosion.

In some embodiments, a liquid treatment system comprises a first electrode and a second electrode. The first electrode comprises a first non-conductive support and a first active structure mechanically supported by the first non-conductive support. The active structure comprises a first active material for electrolytic removal of one or more contaminants from a liquid contacting the first electrode. The second electrode is disposed adjacent to the first electrode and electronically isolated from the first electrode. The second electrode comprises a second active material for electrolytic removal of one or more additional contaminants from the liquid contacting the second electrode. In some embodiments, the liquid treatment system comprises an ionic exchange membrane.

In some embodiments, the first electrode further comprises a conductive assist structure having a conductivity higher than a conductivity of the first active structure and a conductivity of the first non-conductive support. The conductive assist structure may be disposed between the first active structure and the first non-conductive support. The conductive assist structure maybe incorporated into at least one of the first active structure or the first non-conductive support. In some embodiments, the conductive assist structure comprises one of a metal, a carbon nanotube, a conductive carbon, carbon black, graphene, a conductive adhesive or a conductive polymer or a combination thereof. The metal of the conductive assist structure may be one of nickel, titanium, copper, chromium, stainless steel, gold, tantalum, niobium, hafnium, zirconium, vanadium, indium, cobalt, tungsten or a combination thereof. The conductive assist structure may be a layer having an average thickness of between about 1 micrometer and 10 micrometers.

In some embodiments, the first non-conductive support comprises a polymer. The polymer of the first non-conductive support may comprise one of polyethylene terephthalate (PET), biaxially-oriented PET (BoPET), poly(butylene terephthalate) (PBT) poly(trimethylene terephthalate) (PTT), poly(ethylene naphthalate) (PEN), poly(glycolic acid) (PGA), poly(actic acid) (PLA), polycaprolactone (PCL), polyhydroxyalkanoate (PHA), poly(3-hydroxybutyrate) (PHB), poly(ethylene adipate) (PEA), poly(butylene succinate) (PBS), or cellophane.

In some embodiments, the first electrode and the second electrode form a jellyroll or a stack. The stack formed by the first electrode and the second electrode may comprise a torturous path for the liquid flowing through the liquid treatment system.

In some embodiments, the first electrode is electrically coupled to a first liquid permeable busbar, while the second electrode is electrically coupled to a second liquid permeable busbar. The first liquid permeable busbar may comprise a channel formed by an extension electrically coupled to the first electrode.

In some embodiments, the first active structure comprises an activated carbon. In the same or other embodiments, the first active material and the second active material are the same. For example, the second electrode may comprise a second non-conductive support and a second active structure. The second active structure may be mechanically supported by the second non-conductive support. The first non-conductive support and the second non-conductive support may have substantially the same compositions. The first non-conductive support and the second non-conductive support may have substantially the same thicknesses.

In some embodiments, the liquid treatment system is a water desalination system. In the same or other embodiments, the one or more contaminants removed by the system comprises of sodium ions, chloride ions, calcium ions, magnesium ions, carbonate ions, ammonium ions, nitrate ions, chromate ions, sulphate ions, sulphonate ions, phosphate ions, arsenic ions, aluminum ions, iron ions or other heavy metal ions. In some embodiments, the liquid treatment system is a water softening system. In some embodiments the liquid treatment system is a water purification system.

Provided also is an electrode for a liquid treatment system. The electrode may comprise a non-conductive support and an active structure mechanically supported by the non-conductive support. The active structure may comprise an active material for electrolytic removal of one or more contaminants from a liquid contacting the electrode. The electrode may also comprise a conductive assist structure having a conductivity higher than a conductivity of the active structure and a conductivity of the non-conductive support. In some embodiments, the conductive assist structure is disposed between the first active structure and the non-conductive support. In the same or other embodiments, the conductive assist structure is incorporated into at least one of the active structure or the non-conductive support. The conductive assist structure may comprise one of a metal, a carbon nanotube, a conductive carbon, carbon black, graphene, a conductive adhesive or a conductive polymer. The metal of the conductive assist structure may comprise one of nickel, titanium, copper, chromium, stainless steel, gold, tantalum, niobium, hafnium, zirconium, vanadium, indium, cobalt, tungsten or a combination thereof. In some embodiments, the conductive assist structure is a layer having an average thickness of between about 1 micrometer and 10 micrometers.

In some embodiments, the non-conductive support comprises a polymer. The polymer of the non-conductive support may comprise one of polyethylene terephthalate (PET), biaxially-oriented PET (BoPET), poly(butylene terephthalate) (PBT) poly(trimethylene terephthalate) (PTT), poly(ethylene naphthalate) (PEN), poly(glycolic acid) (PGA), poly(actic acid) (PLA), polycaprolactone (PCL), polyhydroxyalkanoate (PHA), poly(3-hydroxybutyrate) (PHB), poly(ethylene adipate) (PEA), poly(butylene succinate) (PBS), or cellophane.

In some embodiments, the active structure comprises an activated carbon.

Also provided is a method of forming an electrode of a liquid treatment system. In some embodiments, the method comprises providing a non-conductive support and forming an active structure on the non-conductive support. The active structure may be mechanically supported by the non-conductive support. The active structure may comprise an active material for electrolytic removal of one or more contaminants from a liquid contacting the electrode.

In some embodiments, the method also comprising, prior to forming the active structure on the non-conductive support, forming a conductive assist structure on the non-conductive support such that the conductive assist structure is disposed between the non-conductive support and the active structure. The conductive assist structure may have a conductivity higher than a conductivity of the active structure and a conductivity of the non-conductive support. Forming the conductive assist structure may comprise one of micro gravure, slot die, spin-coating, spray coating, or physical, or chemical vapor deposition.

In some embodiments, the method further comprises forming an electrical connection to the conductive assist structure. This forming may comprise crimping, staking, welding, press fitting or gluing using a conductive adhesive. The electrical connection may be formed to a busbar.

In some embodiments, the conductive assist structure comprises one of a metal, a carbon nanotube, a conductive carbon, carbon black, graphene, a conductive adhesive or a conductive polymer. The metal of the conductive assist structure may comprise one of nickel, titanium, copper, chromium, stainless steel, gold, tantalum, niobium, hafnium, zirconium, vanadium, indium, cobalt, tungsten or a combination thereof. The conductive assist structure may be a layer having an average thickness of between about 1 micrometer and 10 micrometers. The non-conductive support may comprise a polymer.

In some embodiments, forming the active structure on the non-conductive support comprises one of doctor blade coating, micro gravure, reverse application roller with comma blade, slot die, spray coating, or physical or chemical vapor deposition Also provided is a method of operating a liquid treatment system. The method may comprise applying a first voltage potential between a first electrode and a second electrode while the first electrode and the second electrode are in contact with a first liquid. The first electrode may comprise a non-conductive support and a first active structure mechanically supported by the non-conductive support. The active structure may comprise a first active material. The second electrode may be disposed adjacent to the first electrode and electronically isolated from the first electrode. The second electrode may comprise a second active material. Applying the first voltage potential may electrolytically remove one or more contaminants from the first liquid contacting the first electrode and the second electrode and deposit these one or more contaminants on the first electrode and the second electrode.

The method may also comprise applying a second voltage potential between the first electrode and the second electrode while the first electrode and the second electrode are in contact with a second liquid different from the first liquid. The second voltage potential has an opposite polarity than the first voltage potential or zero voltage. Furthermore, applying the second voltage potential may electrolytically remove the one or more contaminants from the first electrode and the second electrode into the second liquid.

In some embodiments, applying the first voltage potential between the first electrode and the second electrode comprises flowing the first liquid between the first electrode and the second electrode. At least a portion of the first liquid may flow through the first electrode or the second electrode. In some embodiments, substantially all of the first liquid flows through the first electrode and through the second electrode.

In some embodiments, applying the first voltage potential between the first electrode and the second electrode and monitoring conductivity of the first liquid after the first liquid exits from between the first electrode and the second electrode.

In some embodiments, the first electrode comprises a conductive assist structure and wherein the first voltage is applied to the conductive assist structure. The conductive assist structure may comprise one of a metal, a carbon nanotube, a conductive carbon, carbon black, graphene, a conductive adhesive or a conductive polymer. The metal of the conductive assist structure may comprise one of nickel, titanium, copper, chromium, stainless steel, gold, tantalum, niobium, hafnium, zirconium, vanadium, indium, cobalt, tungsten or a combination thereof. The conductive assist structure may be a layer having an average thickness of between about 1 micrometer and 10 micrometers. In some embodiments, the one or more contaminants comprises one of sodium ions, chloride ions, calcium ions, magnesium ions, carbonate ions, ammonium ions, nitrate ions, chromate ions, sulphate ions, sulphonate ions, phosphate ion, arsenic ions, aluminum ions, iron ions or other heavy metal ions.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

Symmetrical supercapacitors typically use aluminum foil as a current collector for both electrodes, i.e., the anode and cathode. However, aluminum corrodes in the presence of salt-containing water in the form of pitting or a more thorough degradation when exposed to electrical current. As a result, aluminum foil current collectors cannot be used in water desalination applications using flow-through supercapacitor devices. Furthermore, aluminum current collectors are typically the most expensive components of a flow-through supercapacitor. Replacement of aluminum foil with graphite foil (e.g., GRAFOIL® available from GrafTech in Independence, Ohio), carbon felt, titanium, stainless steel, and copper proved to be too costly and impractical.

It has been found that polyesters (e.g., polyethylene terephthalate (PET), biaxially-oriented PET (BoPET), poly (butylene terephthalate) (PBT) poly(trimethylene terephthalate) (PTT), poly(ethylene naphthalate) (PEN), poly(glycolic acid) (PGA), poly(actic acid) (PLA), polycaprolactone (PCL), polyhydroxyalkanoate (PHA), poly(3-hydroxybutyrate) (PHB), poly(ethylene adipate) (PEA), poly(butylene succinate) (PBS), or cellophane) may be used as non-corroding current collector substrates for desalination applications. Brand names of polyester films include Mylar, Melinex and Hostaphan. There are many types of polyesters and the term polyester herein is used to describe all types of polyesters. In addition to not corroding, polyester films can be lower in cost than even aluminum foils. The polyester films are however non-conductive and as such are impractical for use as a current collector on their own.

Cellulose based films (e.g., cellophane) may also be used as a non-corroding current collector substrate for desalination applications. Cellulose films are current used as a substrate for adhesive tapes, among other applications, however there are certain cellulose films that are water soluble.

To make the polyester conductive, a thin coating of a highly conductive material can be formed on the surface of the polyester film. These materials can include conductive carbons and conductive adhesives (e.g., DAG, such as DAG-T-502 Carbon Paint available from Ted Pella, Inc. in Redding, Calif.).

Examples of Liquid Treatment Systems and Electrodes for Such Systems

Figure 1A:
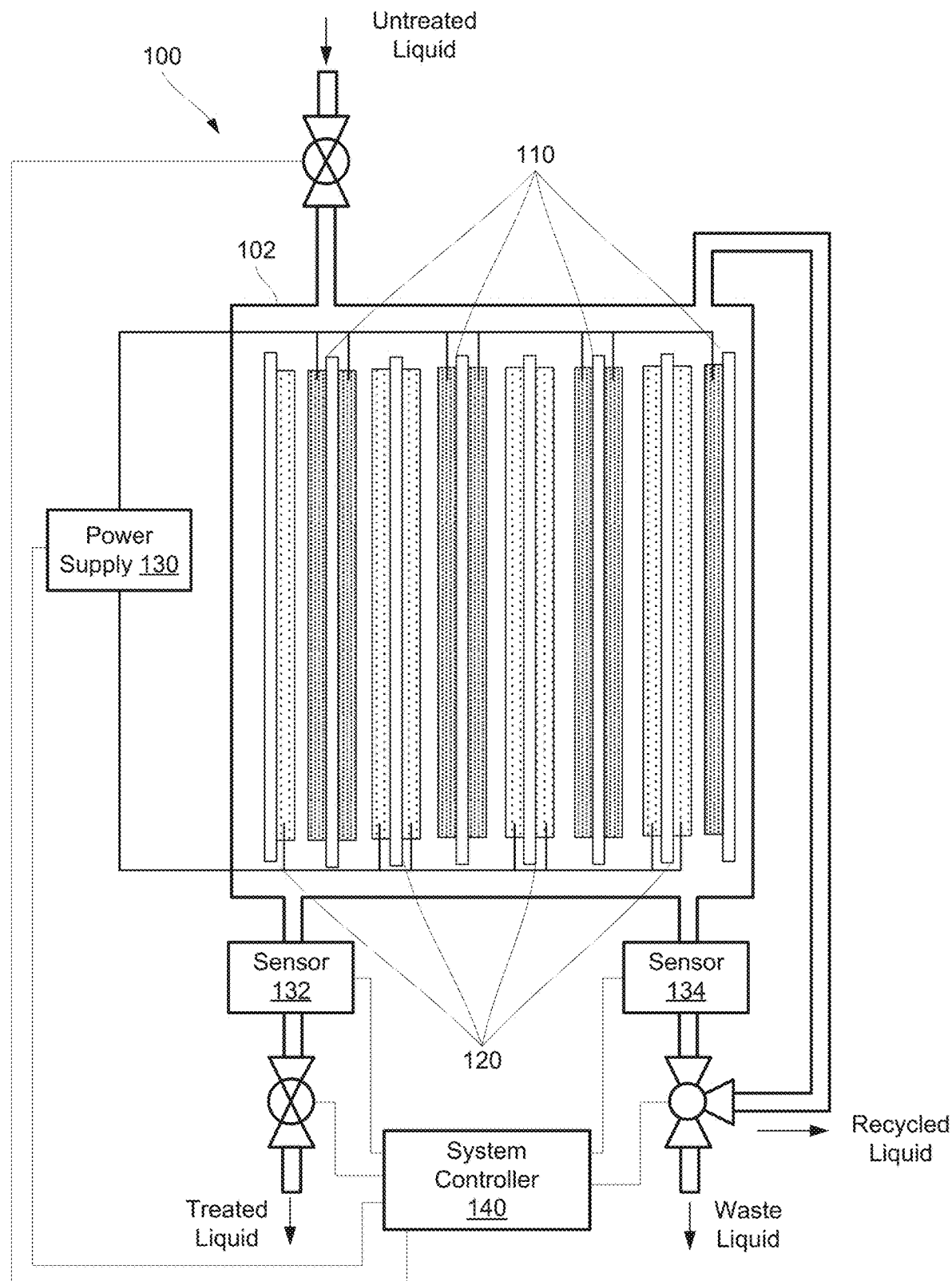
FIG. 1A is a schematic representation of a liquid treatment system, in accordance with some embodiments.

FIG. 1A is a schematic representation of liquid treatment system 100, in accordance with some embodiments. Liquid treatment system 100 may include enclosure 102 containing a set of first electrodes 110 and a set of second electrodes 120. First electrodes 110 operate at a different electrode potential than second electrodes 120 thereby creating a voltage between first electrodes 110 and second electrodes 120. Depending on polarity of first electrodes 110 or second electrodes 120 they may be referred to as positive electrodes or negative electrodes and/or anodes or cathodes. First electrodes 110 and second electrodes 120 may be connected to power supply 130 controlling the potential of these electrodes. The number of electrodes in each set and the arrangement of first electrodes 110 and second electrodes 120 is further described below with reference to FIGS. 3A-3D.

A typical design for a supercapacitor is to wind a pair of double sided electrodes between two layers of an electrical insulating separator material in a "jelly roll" design. In a flow-through capacitor (FTC) the salt water would be passed from one end to the other through the separator and the pores of the activated carbon layer. Salinated water would enter one end and desalinated water would exit the other end of the supercapacitor. Tabs can be welded to the current collectors if they are metallic or pressed or staked into a non-metallic current collector. In another embodiment, the electrodes can be coated with activated carbon but leave an uncoated edge strip. Each electrode would have its uncoated edge strip extending beyond the separator. Terminal plates can be connected to the uncoated strips at each end of the jelly roll for current collection. Depending on the material of the current collector the terminal plates can be pressed into or welded to the current collectors. If pressed a conductive adhesive may be used to enhance electrical conductivity. To allow the flow of water, the terminal plate can be porous in either a foam, expanded metal, perforated metal or woven design.

To minimize the system cost and prevent corrosion, the outer cylindrical case for the capacitor would preferably be a polymer tube, made of a potable material, including but not limited to ABS, PVC, CPVC (Chlorinated PVC), HDPE, PEX (Cross-linked PE), etc. The end caps would be, preferably but not limited to, a similar material. The end caps would be screwed on to allow for removal and replacement of the supercapacitor core. The end caps could also be glued or welded to the tube providing a permanent enclosure.

Figure 1B:
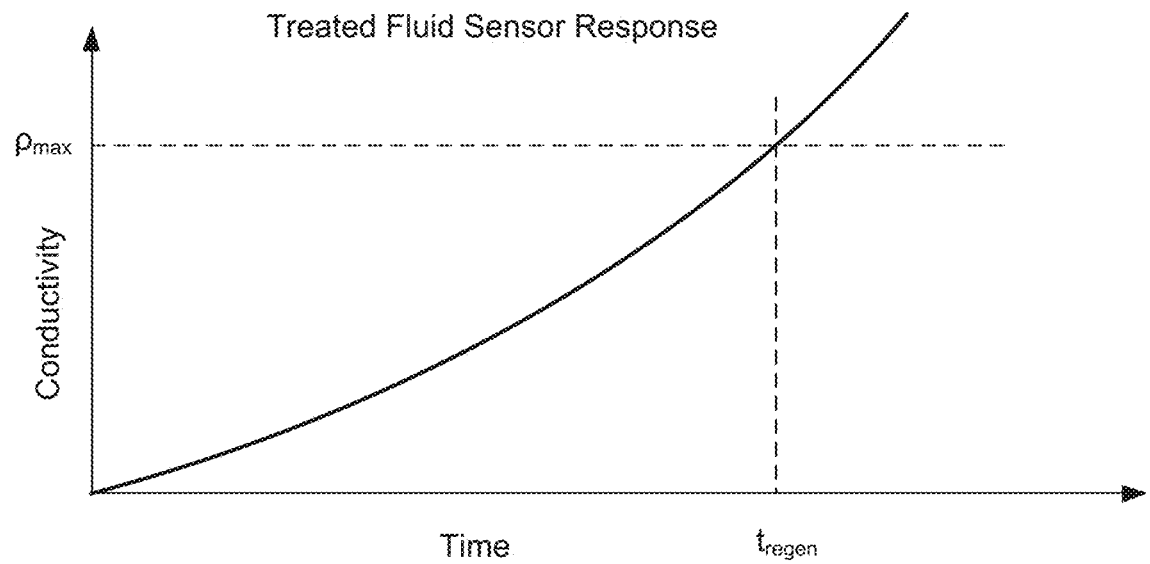
FIG. 1B is a schematic representation of a sensor response used for monitoring treated liquid, in accordance with some embodiments.
Figure 1C:
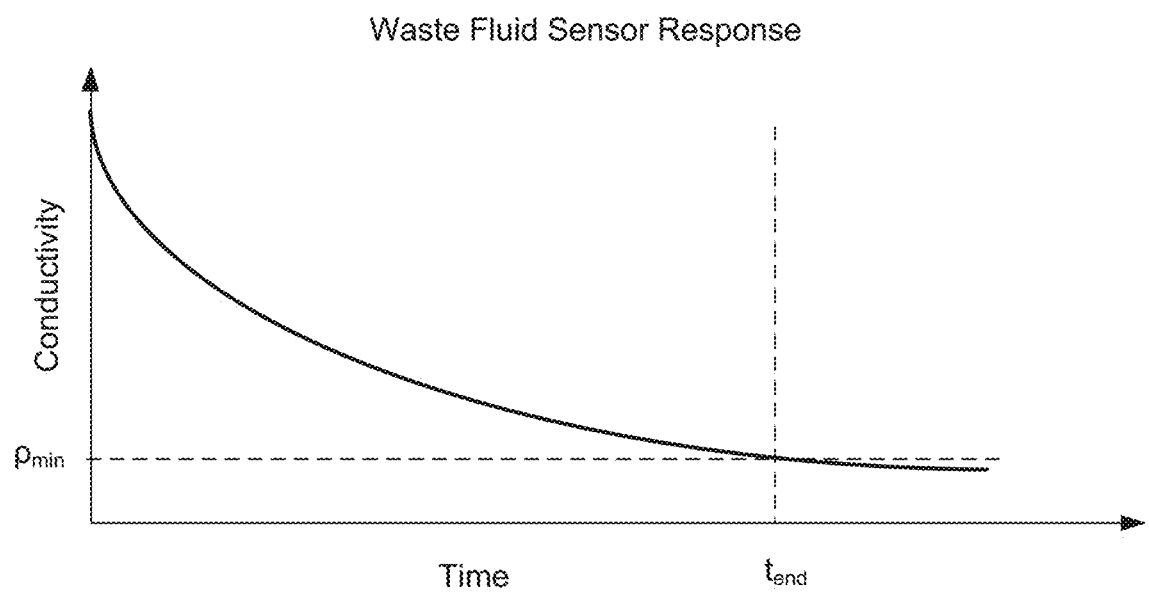
FIG. 1C is a schematic representation of a sensor response used for monitoring waste liquid, in accordance with some embodiments.

Liquid treatment system 100 may also include valves for controlling flow of liquids into enclosure 102 and out of enclosure 102. Furthermore, liquid treatment system 100 may include one or more sensors for controlling various properties of liquid as it enters or leaves enclosure 102. For example, sensor 132 may measure the conductivity of the treated liquid as it leaves enclosure 102. Referring to a desalinization example, when the liquid is treated and the salt is removed from the liquid, the conductivity of the treated liquid becomes less than that of the untreated liquid. Ions from the incoming salts are adsorbed on electrodes 110 and 120. As more and more ions gets adsorbed on electrodes 110 and 120, the efficiency of electrodes 110 and 120 is reduced resulting in more salt remaining in the treated liquid and, as a result, a higher conductivity of the treated liquid. FIG. 1B is a schematic representation of a response of sensor 132 used for monitoring the treated liquid, in accordance with some embodiments. The conductivity of the treated liquid increases over time until it reaches some maximum conductivity threshold ($\rho_{max}$), at which point the adsorbed ions need to be removed from electrodes 110 and 120 in order to increase their efficiency. This process may be referred to as electrode regeneration. During electrode regeneration, the polarity of electrodes 110 and 120 may be reversed in comparison to the liquid treatment process to repel the ions from electrodes 110 and 120 and into the liquid, or they could have zero voltage. The valve for sensor 132 is closed and the valve for sensor 134 is opened to either the waste liquid or recycled liquid lines. The increase in the ionic concentration of the liquid used for electrode regeneration results in the conductivity increase of this liquid. FIG. 1C is a schematic representation of a response of sensor 134 used for monitoring electrode regeneration liquid, in accordance with some embodiments. As less ions remain on electrodes 110 and 120 and more ions being present in the electrode regeneration liquid, the conductivity of the liquid eventually decreases to the level of the starting untreated or recycled liquid. Depending on the availability of the untreated liquid and/or other factors, the liquid discharged from enclosure after or during electrode regeneration can be recycled back into the enclosure for additional regeneration of electrodes 110 and 120 or discharged as a waste liquid. One having ordinary skills in the art would understand that a similar recirculating loop may be used for the treated fluid to achieve, for example, higher treatment levels.

FIGS. 2A-2F are schematic representations of different electrodes used in the liquid treatment system of FIG. 1A, in accordance with some embodiments.

FIGS. 3A-3D are schematic representations of different electrode arrangements used in liquid treatment system 100 of FIG. 1A, in accordance with some embodiments. While the reference is made to first electrode 110, one having ordinary skills in the art would understand that these electrode arrangements may be applicable to the second electrode 120 as well. In some embodiments, first electrode 110 and second electrode 120 may have the same configuration, e.g., use the same non-conductive support 112 and/or conductive assist structure 116.

Figure 2A:
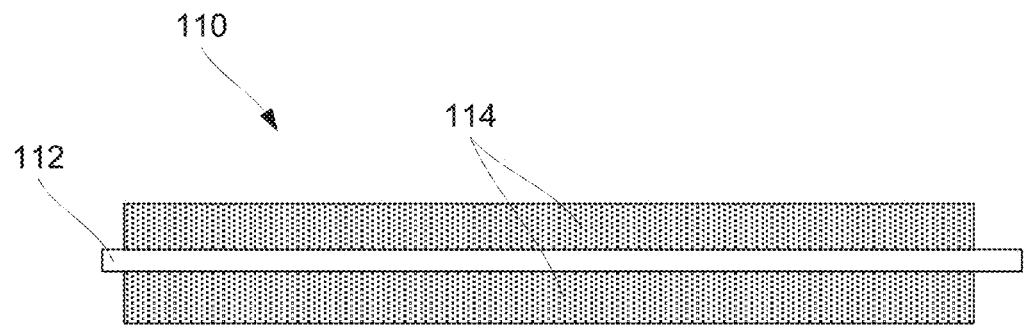
FIGS. 2A-2F are schematic representations of different electrodes used in the liquid treatment system of FIG. 1A, in accordance with some embodiments.

FIG. 2A illustrates first electrode 110 including non-conductive support 112 and two active structures 114 disposed on opposite sides of non-conductive support 112. In some embodiments, first electrode 110 may include one active structure 114 disposed on one side of non-conductive support 112. For purposes of this disclosure, non-conductive support 112 is a structure which has a low electronic conductivity, such as less than $1\times10^{-16}$ S/m. As an example, PET has an electronic conductivity of $1\times10^{-21}$ S/m. It should be noted that in some embodiments, non-conductive support 112 may be ionically conductive and/or liquid permeable. In comparison to conventional current collectors, non-conductive support 112 does not corrode, may be easier to process, and generally less expensive. In some embodiments, non-conductive support 112 may be a layer.

Separators have a different function in flow through capacitors (FTC) as the electrolyte not only flows through the plane of the separator as in a typical supercapacitor but the electrolyte, i.e. seawater flows along the plane of the separator as it flows through the FTC system. Greater porosity is required. Various electrically non-conductive materials can be used including polymers, paper, resins and cloth. Beads may be coated onto the surface of an electrode with a water soluble electrolyte, and the binder be removed with the flow of water. Mesh would provide high porosity. A thick separator would allow greater flow but there is an optimum thickness based on the ionic conductivity of the electrolyte, flow rate and ion extraction, or if the electrodes are physically separated, no separator may be required.

In the example shown in FIG. 2A, active structures 114 may be responsible for substantially all (e.g., at least about 95%) of the electronic conductivity of first electrode 110. In some embodiments, the electronic conductivity of active structures 114 alone may not be sufficient and conductive assist structures 116 may be added to first electrode 110 to increase its overall electronic conductivity as will now be explained with reference to FIGS. 2B-2F.

Figure 2B:
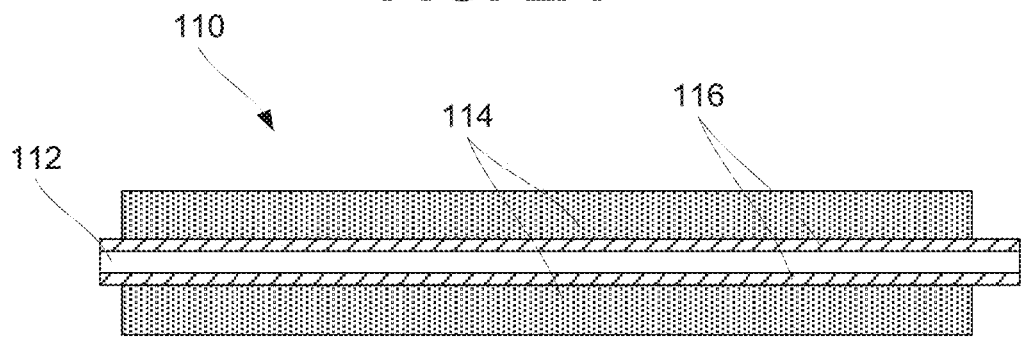

FIG. 2B illustrates another example of first electrode 110 including non-conductive support 112, two active structures 114 disposed on opposite sides of non-conductive support 112, and two conductive assist structures 116. Each conductive assist structure 116 may be disposed between corresponding active layer 114 and non-conductive support 112. This orientation of conductive assist structure 116 allows using conductive assist structure 116 that is not permeable to ions, such as a continuous metal layer. Other orientations of conductive assist structure 116, such as within active layer 114 or on the top of active layer 114 may need conductive assist structure 116 that are ionically conductive. The purpose of conductive assist structure 116 is to provide uniform potential to different areas of active layer 114. For example, first electrode 110 may be formed as a sheet and an electrical connection to this sheet may be formed along one edge. Conductive assist structure 116 may provide some electronic conductivity from this electrical connection to other parts of first electrode 110. In some embodiments, the electronic conductivity contribution of conductive assist structure 116 within first electrode 110 where active layer 114 is substantially free from absorbed ions is at least about 50% or, more specifically, at least about 75% or even at least about 90%. The remaining conductivity may be provided by active layer 114.

In other embodiments, the activated carbon coating in the electrode is mixed with a conductive carbon black additive which provides for electronic conduction along the current collector. Different types of carbon blacks are available. For example, Vulcan XC-72R available from Cabot can be used. Carbon nanotubes (CNTs) and single wall carbon nanotubes (SWCNT), such as those available from OCSiAl, can also be also used. For example, CNTs can be coated onto non-conductive substrates or mixed into the activated carbon formulation. Graphene is another option for providing conductivity as the substrate coating or incorporated into the activated carbon formulation, and is available from multiple suppliers. CNT and graphenes, although expensive, can be used in very small quantities, resulting in a low overall cost.

In some embodiments, a thin conductive coating of a non-corrosive metal (e.g., nickel (Ni), titanium (Ti), copper (Cu), chromium (Cr), stainless steel, gold (Au), tantalum (Ta), niobium (Nb), hafnium (Hf), zirconium (Zr), vanadium (V), indium (In), cobalt (Co), tungsten (W)), may be formed on a polyester film. For example, a thickness of the metal coating may be between about 0.5 micrometers and 25 micrometers or, more specifically, between about 1 micrometer and 10 micrometers or even between about 1 micrometer and 5 micrometers per side on the non-conductive film 112. Even such a thin coating provides a sufficient electrical conductivity without significant increase in a cost of the electrodes. For comparison, a typical nickel electrode can be 10 micrometers and 25 micrometers thick since a certain minimal thickness is needed based on mechanical and structural considerations for such self-supporting substrates. Thin metal coatings are supported by the polyester film and can be much thinner, as a result.

The thin conductive coatings can be applied by various techniques including, but not limited to, physical coating techniques including micro gravure and slot die, spin-coating and spray coating, and physical or chemical vapor deposition.

In some embodiments, an electrode is formed without a current collector. The current collector is removed completely and the electrode is designed in such a way that it has mechanical strength and high electrical conductivity and does not require a separate substrate to provide additional tensile strength or a current collector for additional electronic conductivity. The electronic conductivity in the electrode is generated by the addition of conductive materials to the activated carbon binder. These conductive materials can be similar in composition to the conductive coatings described previously. Conductive binders such as polyaniline and polyethylene oxide (PEO)—based systems can be used as a substitute for typical non-conductive binders to increase the conductivity of the electrodes.

Conductive polymers can be added to either the formulation or as conductive coatings including but not limited to polyaniline, polypyrrole, polyacene and polyacetylene.

Coatings can be made onto release sheets (polyester for example), then peeled off. They can be patch coated to the right size, which can be done with a slot die coater, or punched before stacking into a multi-electrode cell assembly. For cost savings the release sheet can be re-used. Binders with good cohesion (between carbon particles) but poor adhesion (to substrate) are required. PTFE is an example of a binder with good cohesion properties. Fibrillated binders are preferred for cohesion.

It is important that the activated carbon used in a CDI system be of low cost. Aerogels and artificial activated carbons appear to be too expensive to make such a CDI system practical. Natural activated carbons are typically lower in cost and may be used for this CDI application. There are two common methods for forming high surface area natural activated carbons. Inexpensive carbon containing raw materials are pyrolyzed at temperatures between 600 and 900° C., typically in an inert atmosphere, for example nitrogen or argon. Following this carbonization step, the carbonized material is oxidized in the presence of oxygen or steam at 600 to 1200° C. This final step activates the carbon. Another low cost technique is a chemical activation where prior to carbonization, the raw material is impregnated with certain chemicals, acids, strong bases or salts; including phosphoric acid, potassium hydroxide, sodium hydroxide, calcium chloride, zinc chloride. These inexpensive raw materials include but are not limited to coconut shells and husks, other nutshells, peat, waste wood products, corn cobs and husks, lignite, coal, petroleum pitch and used tires.

Metallic foams of non-corroding metals including Ni are an option as these foams can be made with very high porosity and as a result a smaller amount of metal to lower the raw material cost. Metallic foams would allow the passage of water through the plane of the electrode.

In some embodiments, the thickness of conductive assist structure 116 may be sufficient to provide sufficient electrical conductivity within first electrode 110 but not sufficient for establishing an electrical connection to other components, such as electrical leads, busbars, and the like. In this case, conductive assist structure 116 may include contact pad 116a as, for example, shown in FIGS. 2C and 2D. The thickness of contact pad 116a may be greater than the average thickness of conductive assist structure 116. Contact pad 116a may be clear from active layers 114 to ensure access to contact pad 116a. In some embodiments, contact pad 116a may be disposed over 116a as, for example, shown in FIG. 2C. While this orientation of contact pad 116a may ensure its mechanical support, it may be difficult to wind a sheet formed by non-conductive support 112 and such conductive assist structure 116 having a variable thickness. To address this winding issue, contact pad 116a may extend beyond the boundary of non-conductive support 112 as, for example, shown in FIG. 2D.

Figure 2C:
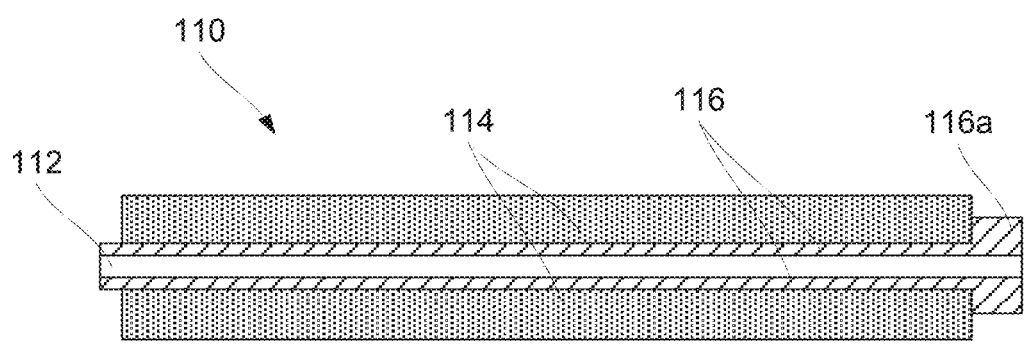
Figure 2D:
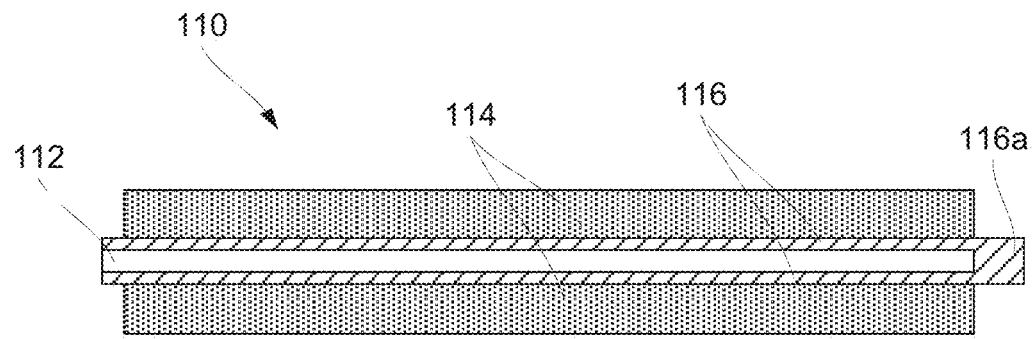
Figure 2E:
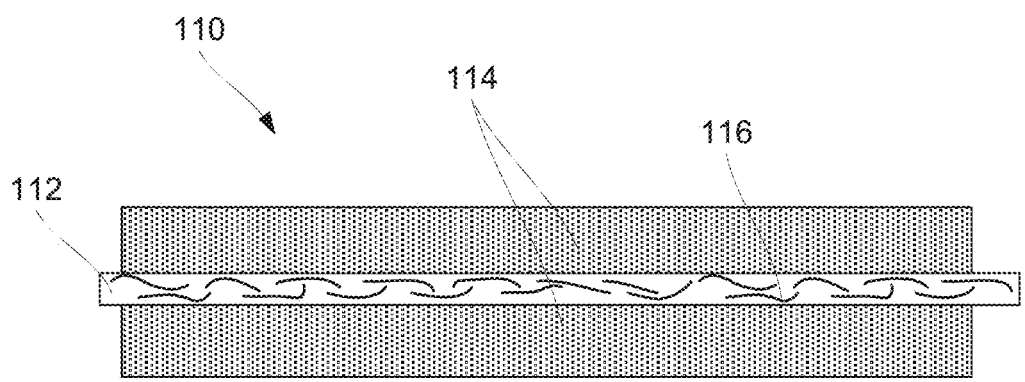
Figure 2F:
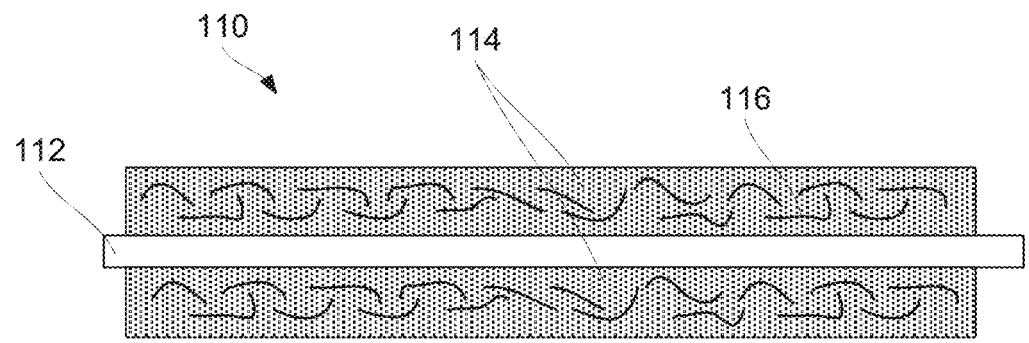

While FIGS. 2B-2D show conductive assist structure 116 being a layer, conductive assist structure 116 may be formed by other types of structures, such as woven or non-woven fibers, mesh or foam. In some embodiments, conductive assist structure 116 may be integrated into non-conductive support 112 (e.g., as shown in FIG. 2E) or into the active structure 114 (e.g., as shown in FIG. 2F).

FIGS. 3A-3D are schematic representations of different electrode arrangements used in the liquid treatment system of FIG. 1A, in accordance with some embodiments. To provide effective liquid treatment, first electrode 110 needs to be positioned close to second electrode 120 yet be electrically isolated from first electrode 110. In some embodiments, first electrode 110 may be disposed between two second electrodes 120 or between different portions of the same second electrode 120 (e.g., when second electrode 120 is bent). For example, first electrode 110 may have two active structures 114 (as shown in FIGS. 2A-2F), each active structure 114 may face different second electrode 120 or different portions of the same second electrode 120. Likewise, second electrode 110 may be disposed between two first electrodes 110 or between different portions of the same first electrode 110.

In some embodiments, a separator may be disposed between first electrode 110 and second electrode 120. The separator may allow for liquid and ions to flow between first electrode 110 and second electrode 120, yet prevent electrical short between first electrode 110 and second electrode 120. It should be noted that a non-conductive portion of one electrode (e.g., non-conductive support 112) may be touching another electrode without causing an electrical short. This feature may be utilized, for example, for maintaining orientation of electrodes and other purposes. For example, non-conductive supports 112 of different electrodes may be mechanically connected.

Figure 3A:
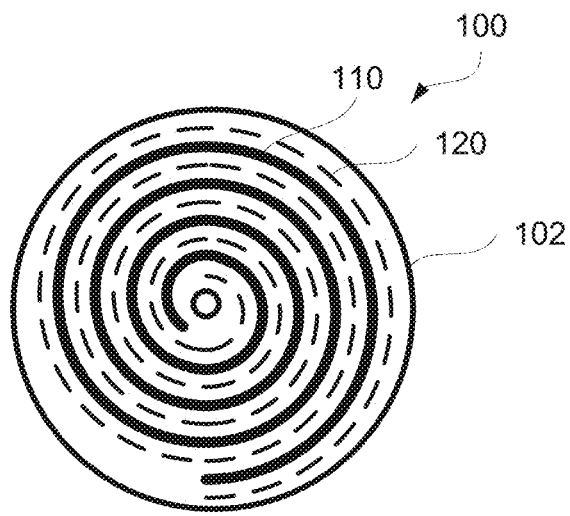
FIGS. 3A-3D are schematic representations of different electrode arrangements used in the liquid treatment system of FIG. 1A, in accordance with some embodiments.
Figure 3B:
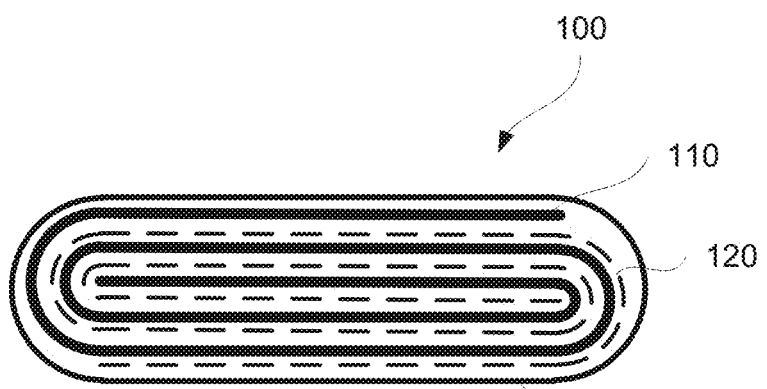

One example of electrode arrangement shown in FIG. 3A may be referred to as a wound arrangement or a jellyroll. The entire jellyroll may be formed by one first electrode 110 and one second electrode 120 that are stacked and wound into a roll. The roll may be cylindrical as shown in FIG. 3A or prismatic as shown in FIG. 3B.

Figure 3C:
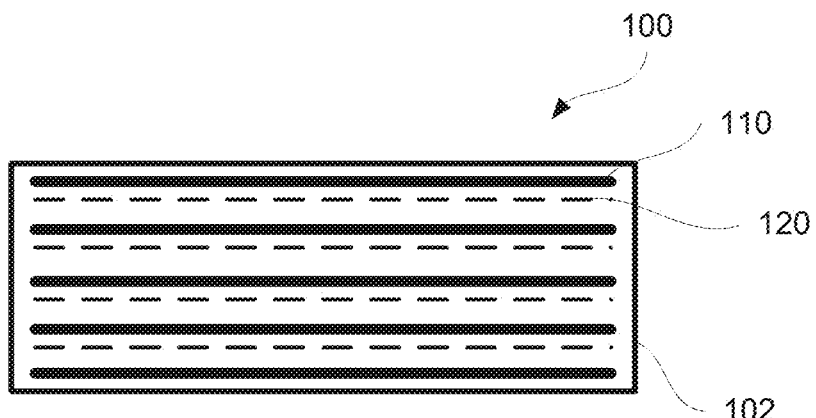

Another example of electrode arrangement shown in FIG. 3C may be referred to as a stacked arrangement, in which first electrodes 110 and second electrodes 120 are alternated in a stack. First electrode 110 and second electrode 120 may be planar. While the stacked arrangement may provide better packed density and may be used in more different shapes of enclosures, it typically uses multiple first electrode 110 and multiple second electrode 120, which require individual fabrication, handling, and arrangement into a stack.

Figure 3D:
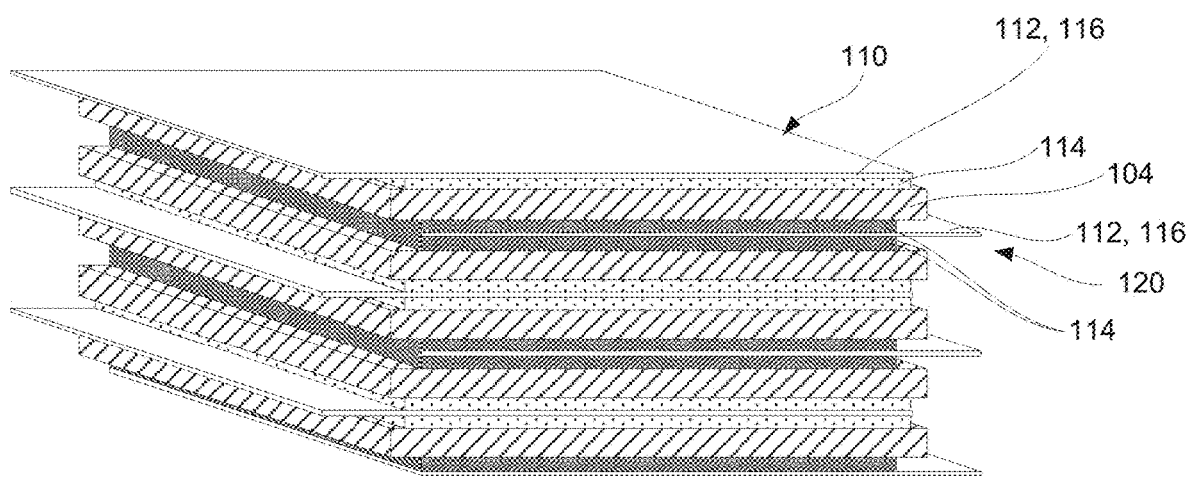

FIG. 3D illustrates a stack formed by first electrode 110 and second electrode 120 with separators 104 disposed between each pair of adjacent first electrode 110 and second electrode 120. FIG. 3B also illustrates active structures 114 disposed on combinations of non-conductive supports 112 and conductive assist structure 116.

Figure 4A:
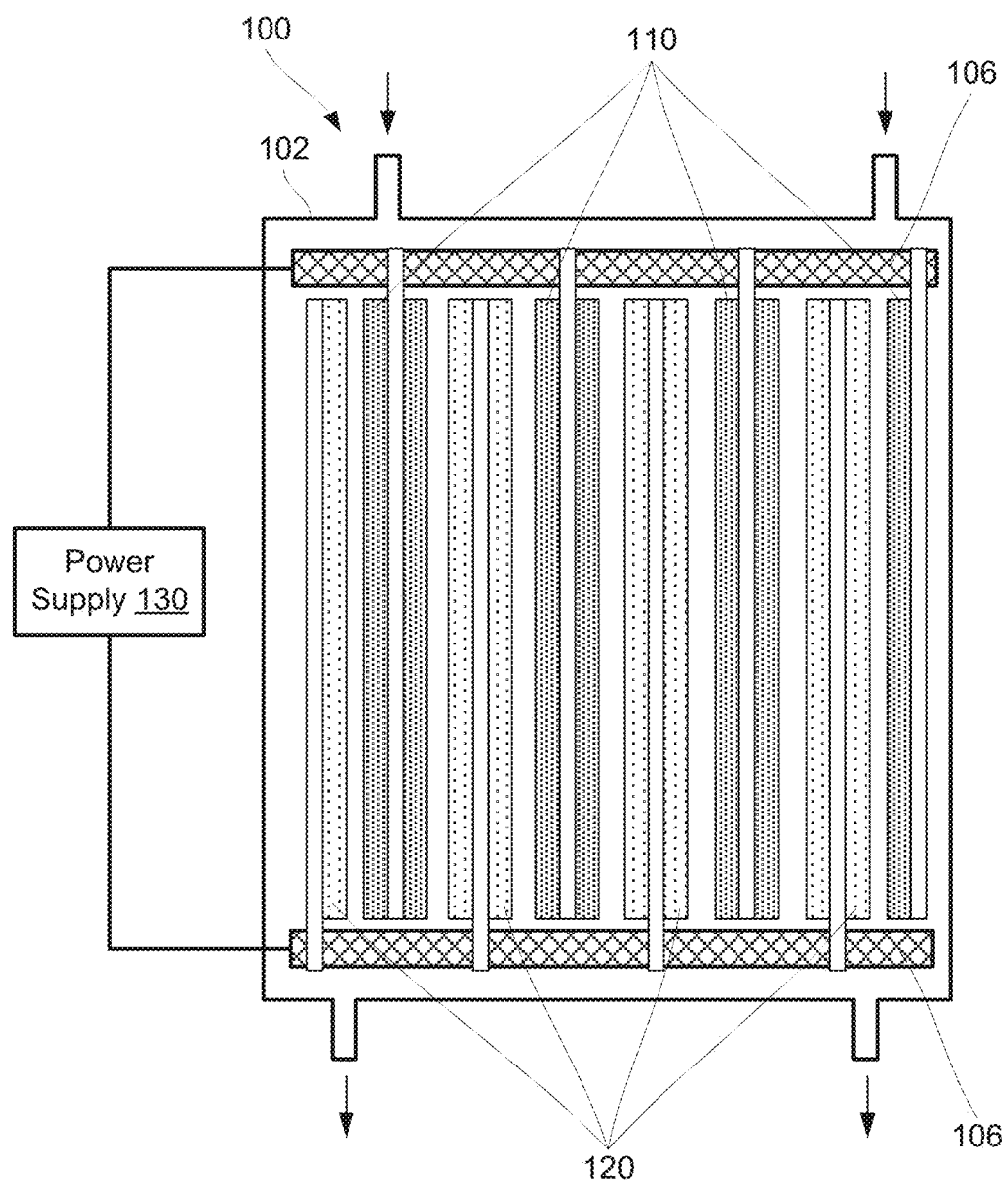
FIG. 4A is a schematic representation of a liquid treatment system including liquid permeable busbars, in accordance with some embodiments.

FIG. 4A is a schematic representation of liquid treatment system 100 including liquid permeable busbars 106, in accordance with some embodiments. As shown in this figure, one liquid permeable busbar 106 may be disposed between one or more inlets into enclosure 102 and electrodes 110 and 120. The other liquid permeable busbar 106 may be disposed between one or more outlets into enclosure 102 and electrodes 110 and 120. Liquid permeable busbar 106 may be used for distribution of the liquid as it enters into enclosure 102 and comes into contact with electrodes 110 and 120 such that all electrodes are exposed to substantially the same flowrate of the liquids. Liquid permeable busbar 106 may be electrically connected to power supply 130 in addition to being connected to respective electrodes 110 and 120.

Figure 4B:
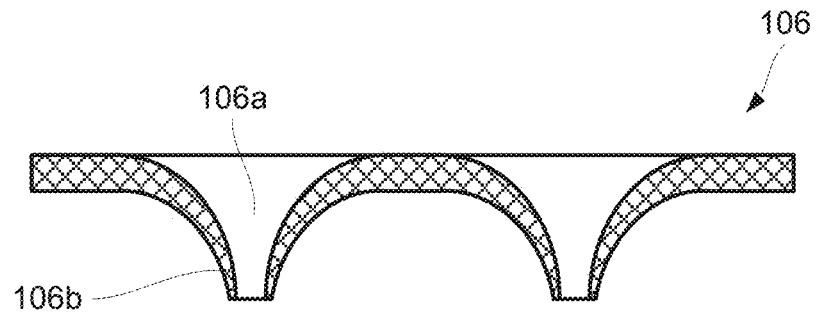
FIG. 4B is a schematic representation of portion of the liquid permeable busbar shown in FIG. 4A, in accordance with some embodiments.

FIG. 4B is a schematic representation of a portion of liquid permeable busbar 106 shown in FIG. 4A, in accordance with some embodiments. Liquid permeable busbar 106 may have openings 106a, which may be formed in a sheet of metal by stamping, punching or other suitable techniques. Formation of openings 106a in liquid permeable busbar 106 may also form extensions 106b, which may be used for making electrical connections to electrodes 110 or electrodes 120. During assembly of liquid treatment system 100, liquid permeable busbar 106 may be pressed against the electrode arrangement such that extensions 106b form electrical connections (e.g., with conductive assist structures 116). Openings 106a provide path for the liquid to flow into the electrode arrangement. Because openings 106a/extensions 106b protrude into the electrode arrangement, it is believed that liquid distribution within this arrangement may be more effective than when the liquid is delivered in bulk (without directing into specific areas of the electrode arrangement).

Figure 5:
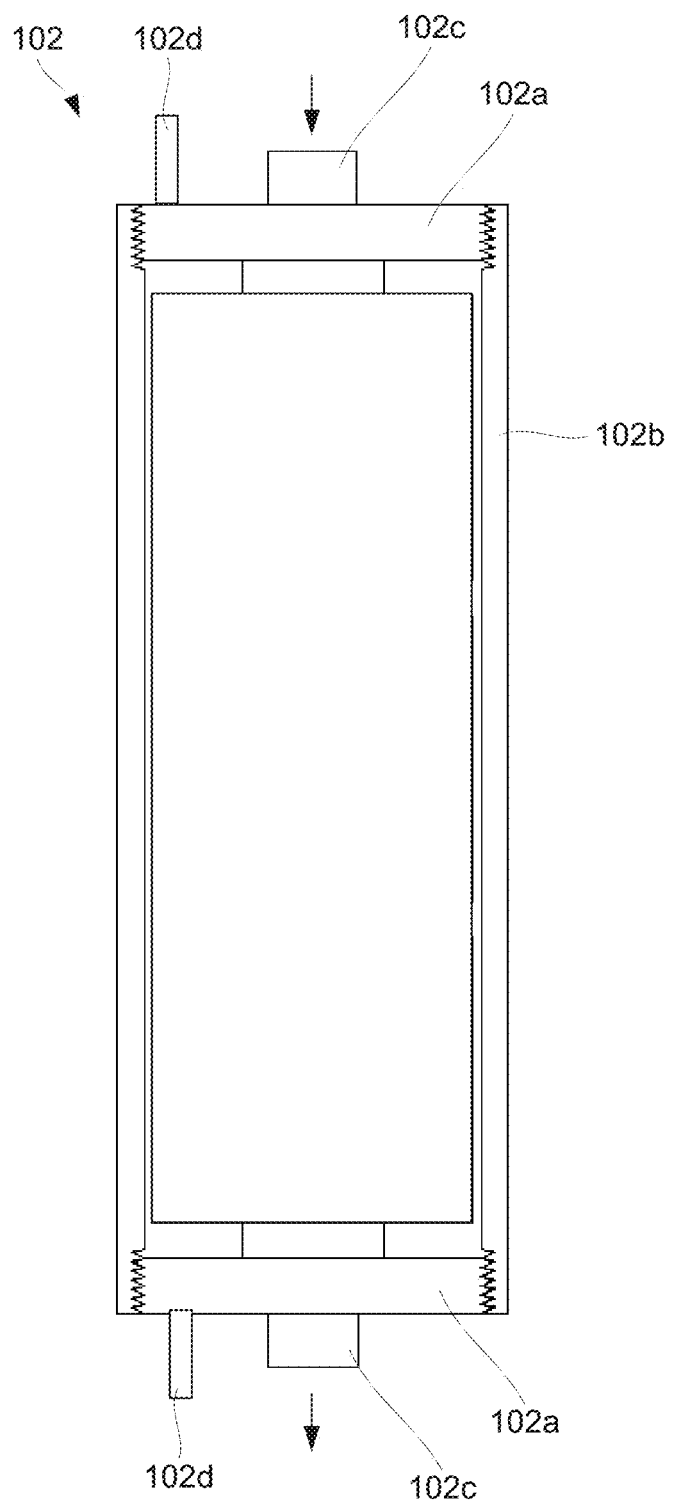
FIG. 5 is schematic representation of an enclosure of a liquid treatment system, in accordance with some embodiments.

FIG. 5 is schematic representation of enclosure 102 of liquid treatment system 100, in accordance with some embodiments. Specifically, enclosure 102 includes case 102b and end caps 102a, which may be threaded into case 102b. This threaded coupling allows simple assembly and disassembly (e.g., for repair and maintenance) of liquid treatment system 100. Each end cap 102 may include pipe connector 102c for supplying the liquid into enclosure 102.

Figure 6A:
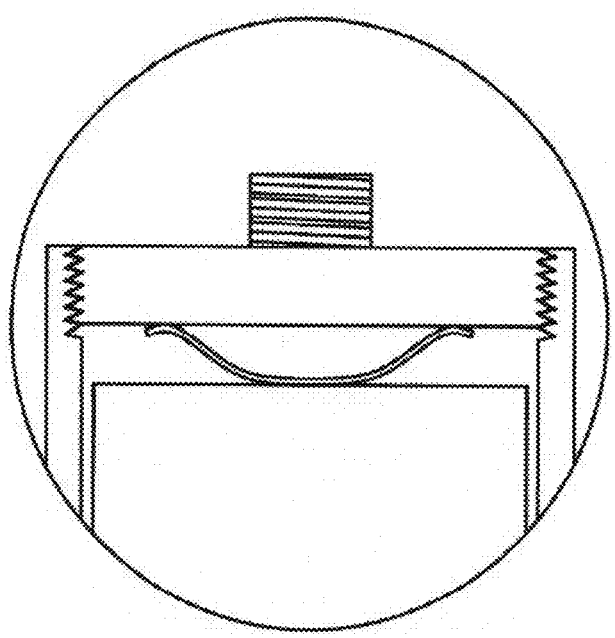
FIGS. 6A-6B are schematic representations of different enclosure features, in accordance with some embodiments.
Figure 6B:
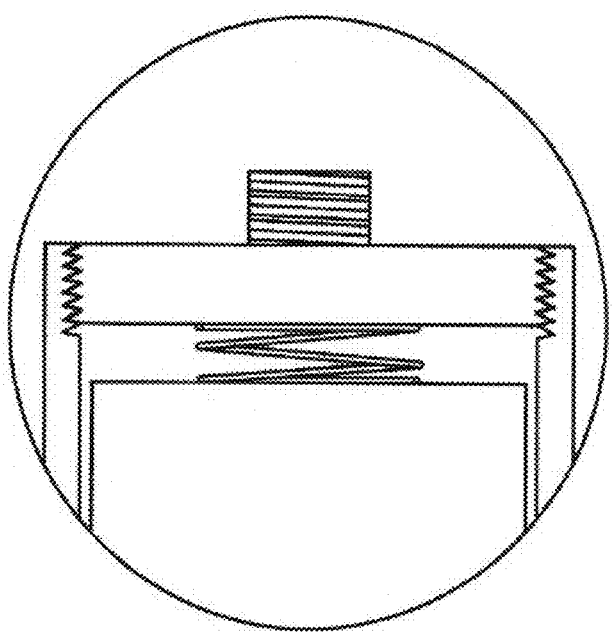

FIGS. 6A-6B are schematic representations of different enclosure features, in accordance with some embodiments. Electrical contact can also be made using a bevel type washer or a simple spring assembly between the header and the jelly roll or stack. In another cell design the active carbon material can be extruded onto the current collectors where the collectors are half-pipes. The half-pipes could be polymer piping as described previously coated with an electrically conducting material also as described previously. The half-pipes would be connected to form a full-pipe using non-conducting glue or insulating clamp system. In this design, there would not be a separator; water would flow through the pipe as the electrodes would be physically held apart, or a porous material could be placed between the electrodes to restrict the flow of water for better efficiency of operation.

Figure 7:
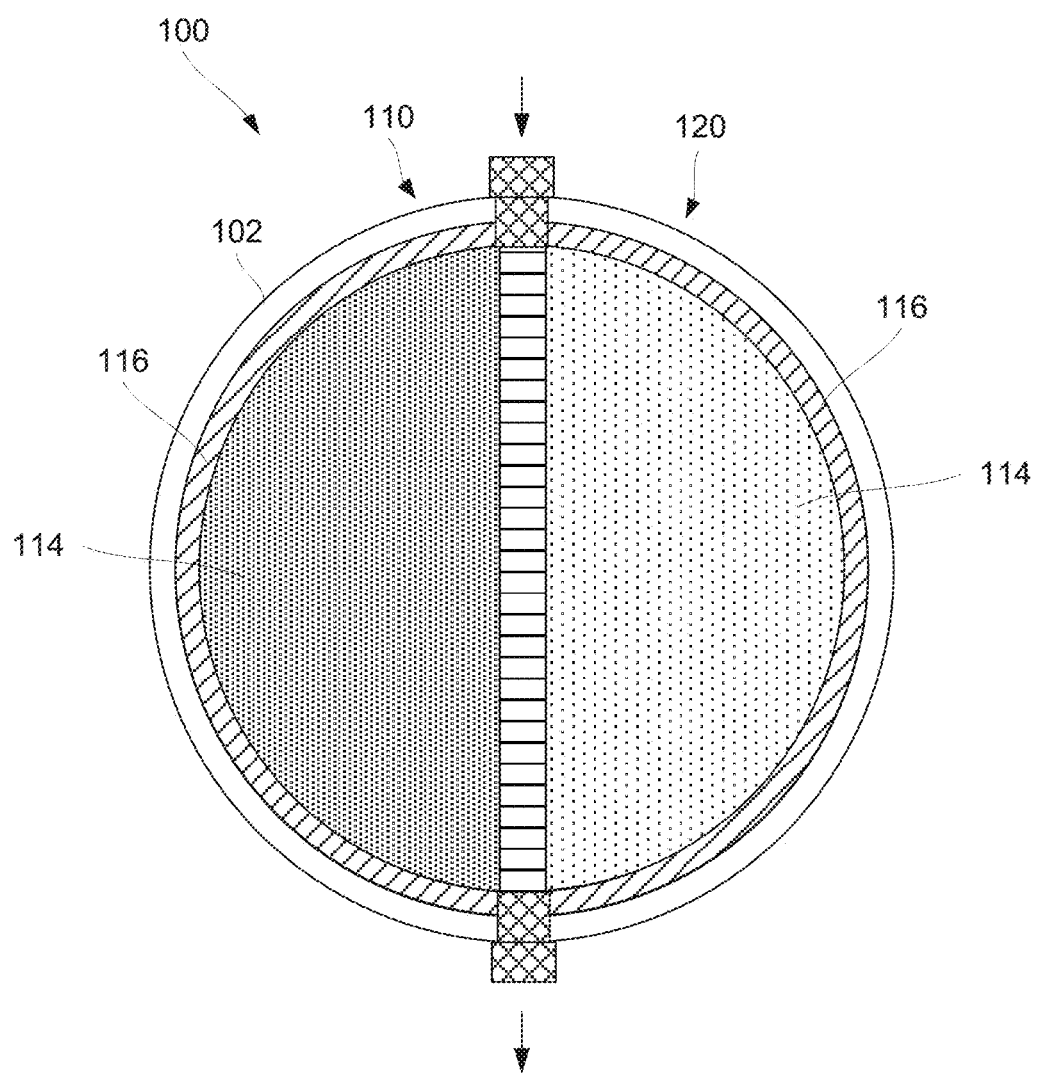
FIG. 7 is a schematic representation of a liquid treatment system, in accordance with some embodiments.

FIG. 7 is schematic representation of liquid treatment system 100 in which enclosure 102 may be also operable as non-conductive support 112. Specifically, a part of enclosure 102 may be supporting first conductive assist structure 116 and first active layer 114 thereby collectively forming first electrode 110. Another part of enclosure 102 may be supporting second conductive assist structure 116 and second active layer 114 thereby collectively forming second electrode 110. First conductive assist structure 116 and first active layer 114 may be electrically isolated from second conductive assist structure 116 and second active layer 114. Enclosure 102 may be made from an insulating material. To form such liquid treatment system 100, enclosure 102 may be initially split into two parts and then each part receives its own conductive assist structure 116 and active layer 114. The two parts may be later connected together. While FIG. 7 illustrates enclosure 102 having a round cross-sectional profile, one having ordinary skills in the art would understand that any shapes may be used for enclosures.

In another cell design the electrodes could be co-extruded in one process. First the inner electrode would be extruded over a metallic, non-corroding wire. The cost of the wire is small compared to that of a flat current collector sheet. Next a separator would be extruded over the inner electrode, followed by the other electrode. The outer current collector could be a variety of designs including but not limited to a metallic non-corroding coating or a conducting carbon or other organic material. This co-extrusion could be placed inside a polymer pipe for mechanical integrity. In another embodiment the outer pipe could be coated with a conducting material. In this design, many small pipes would be connected in parallel. Extrusion is a well known, high throughput manufacturing method.

Figure 8:
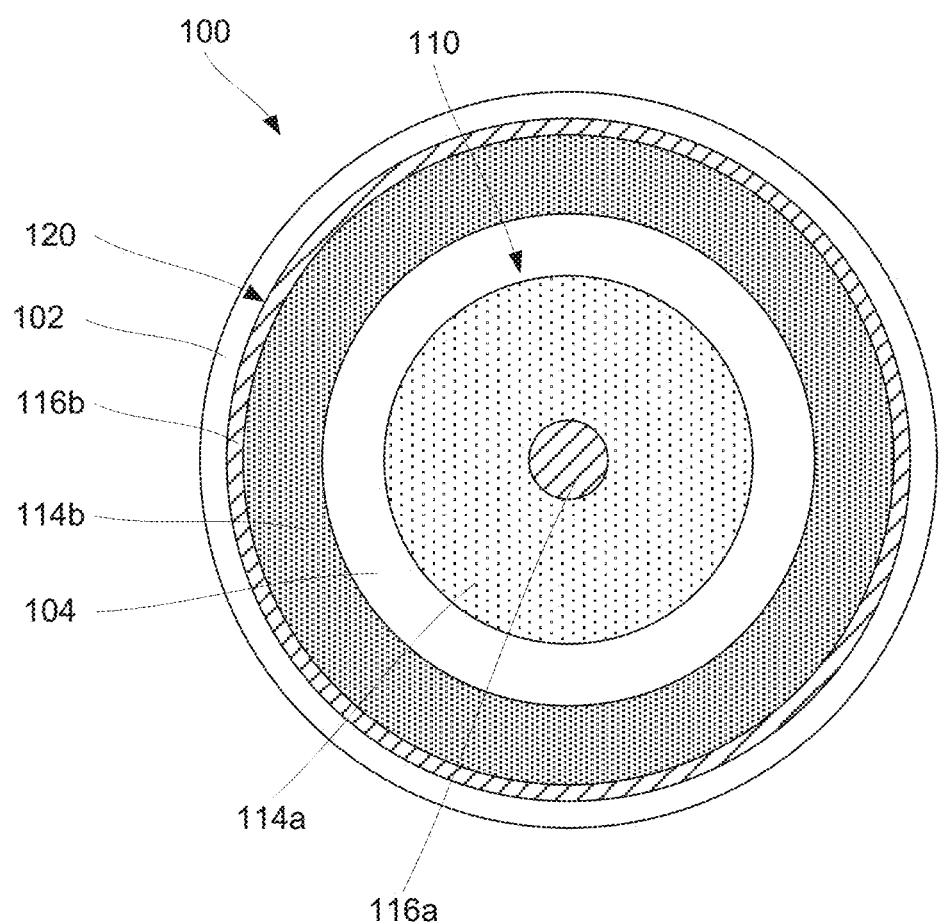
FIG. 8 is schematic representation of a liquid treatment system, in accordance with some embodiments.

FIG. 8 is schematic representation of another example of liquid treatment system 100. In this example, two electrodes 110 and 120 are concentric to each other. Specifically, first electrode 110 includes first conductive assist structure 116a and first active layer 114a. Second electrode 120 includes second conductive assist structure 116b and second active layer 114b. In this example, the function of a non-conductive support may be performed by enclosure 102, separator 104, or both. First electrode 110 is arranged as a core, while second electrode 120 is arranged as a core surrounding first electrode 110.

In another cell design, the inner electrode would be extruded into a pipe with a plurality of holes. This pipe would be designed inside the core of a cylindrical outer electrode. Other secondary treatments including ionic membranes could be used on the inside and outside of the inner pipe. Water would flow into the inner pipe and travel through the holes into the outer pipe where it would exit as the inner pipe would be designed with an end cap to force the water through the inner pipe.

In another design the electrodes could be stacked on top of each other. Using porous current collectors allows the water to flow perpendicular to the planes of the multi-stacked electrodes.

Figure 9A:
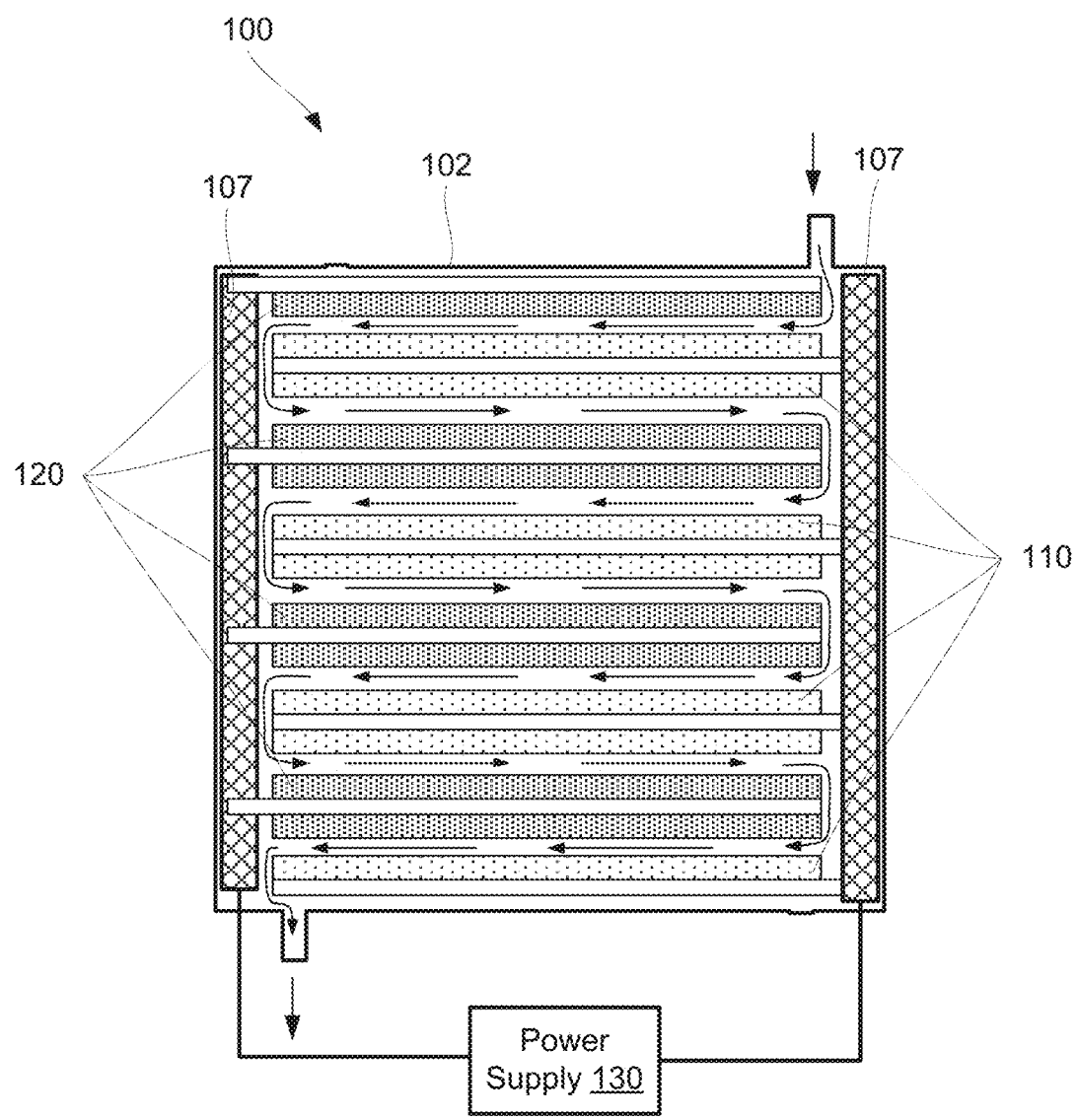
FIGS. 9A-9B are schematic representations of liquid treatment systems having different flow paths, in accordance with some embodiments.
Figure 9B:
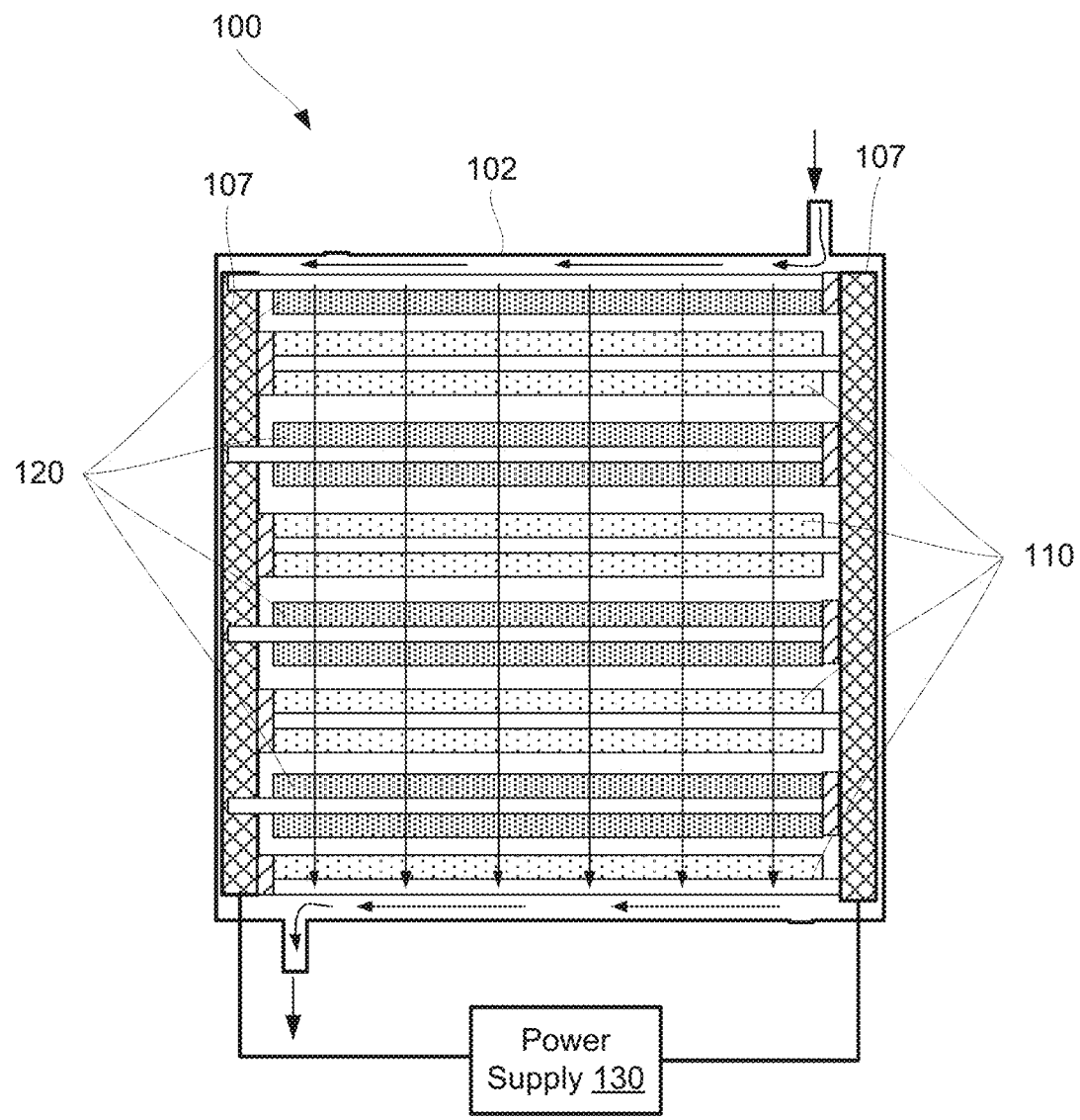

FIGS. 9A-9B are schematic representations of two examples of liquid treatment system 100 having different flow paths. In both examples, liquid treatment system 100 may include first electrodes 110 and second electrodes 120 are stacked in the direction of liquid flow. In the example shown in FIG. 9A, first electrodes 110 and second electrodes 120 may not be sufficiently permeable for all or even most of the liquid to flow through first electrodes 110 and second electrodes 120. As such, portion of the liquid flows part and around electrodes as schematically shown with arrows in FIG. 9A. On the other hand, first electrodes 110 and second electrodes 120 of liquid treatment system 100 shown in FIG. 9B may be permeable such that most and, in some embodiments, all of the liquid passes through first electrodes 110 and second electrodes 120 as the liquid travels through enclosure. Permeable electrodes require permeable current collectors, as the active material is already porous. Permeable non-conductive supports can be perforated, punched or slit sheets, expanded metals, woven or non-woven fabrics and felts, or metallic foams.

Ionic exchange membranes can be used in these cell design configurations. Ionic exchange membranes can be placed in front of the activated carbon electrodes. The membranes prevent the co-ions from leaving the electrode and moving into the liquid stream during the deionization process. During the regeneration process the membranes allow for ion desorption at negative or reversed voltages. The membranes increase the salt removal capacity per deionization and regeneration cycle.

A CDI system can be designed to operate submersed in the sea. A wave actuated electrical generation system would power the supercapacitor. A pump would transport the fresh water to the shore or boat; the regenerated waste effluent would be discharged into the sea. Rapid cycling of the system and a custom designed piping system would allow for efficient distribution of the higher salinity water so as to not affect the local marine environment.

CDI systems could be incorporated into ships where sea water is fed through ports into the CDI system installed inside the ship as it is moving through the water. Little or no additional pumping would be required for the movement of the water. Fresh water would be collected in water tanks inside the ship and saline water would be discharged back into the sea.

CDI systems use a relative small amount of energy to charge their electrodes to the first potential. Furthermore, some of this energy can be recovered during a discharge to the second potential and stored in an energy storage device, such as a rechargeable battery, supercapacitor, flow battery, or flywheel. As a direct result, it is possible for CDI systems to be run off-grid with a primary energy source being solar or wind power.

CDI systems can be used for generating potable water from seawater, brackish water or ground water. Potable water can be provided for remote locations, either coastal or inland, where drinking water is a necessity. The capability to run off-grid is very important in locations where there is no electrical power. Portable, containerized CDI systems can be quickly put into operation where a natural disaster has impacted the municipal water system.

CDI systems can be used to soften hard water containing calcium ions and magnesium ions. Currently in residential systems, the common water softening system uses an ion exchange of two sodium ions for one calcium or one magnesium ion. Many municipalities are banning the use of salt based water softening systems as they add a significant amount of sodium into the municipal water recycling system which is problematic. CDI systems using electrodes described herein would release no or small amounts of sodium ions. Industrial applications including HVAC cooling towers require soft water input as the water is evaporated in the cooling towers to release the heat from the building or application. When water containing calcium and magnesium (hard water) is used, scaling will occur on the inside of the cooling towers and result in corrosion. To combat scaling today chemicals are used. CDI could eliminate the use of descaling chemicals.

Another application where hard water is problematic is in situ oil sands production known as steam assisted gravity drainage. In this method, steam is generated from a surface plant and pumped into a reservoir containing bitumen. The bitumen softens and is then pumped to the surface along with water as an oil and condensed steam emulsion. The water is separated out and recycled to be reused for new steam generation. Current issues are the inability to provide more recycled water using less energy and chemicals. A CDI system would be able to recycle a higher percentage of water, lower the costs for water treatment and lower greenhouse gas emissions.

Very high quality, low contaminant water is needed in the food and beverage industry to provide the best possible product. Example applications include coffee shops, wineries and breweries.

Agriculture relies on desalinated water as many crops will not grow with salt contents greater than 500 ppm. Unfortunately, the source of ground water for many agricultural areas is brackish and unusable. Portable, containerized CDI systems could be deployed wherever desalinated water is required and can moved between fields on a rotational schedule.

Achieving and maintaining water with ultrahigh purity is very important in the manufacture of semiconductor integrated circuits. CDI systems are ideal for removing metal ions to meet the very stringent requirements. CDI systems are also ideal for treating the wastewater from the semiconductor manufacturing process so that it can be reused.

Examples of Forming Electrodes for Liquid Treatment Systems

Figure 10:
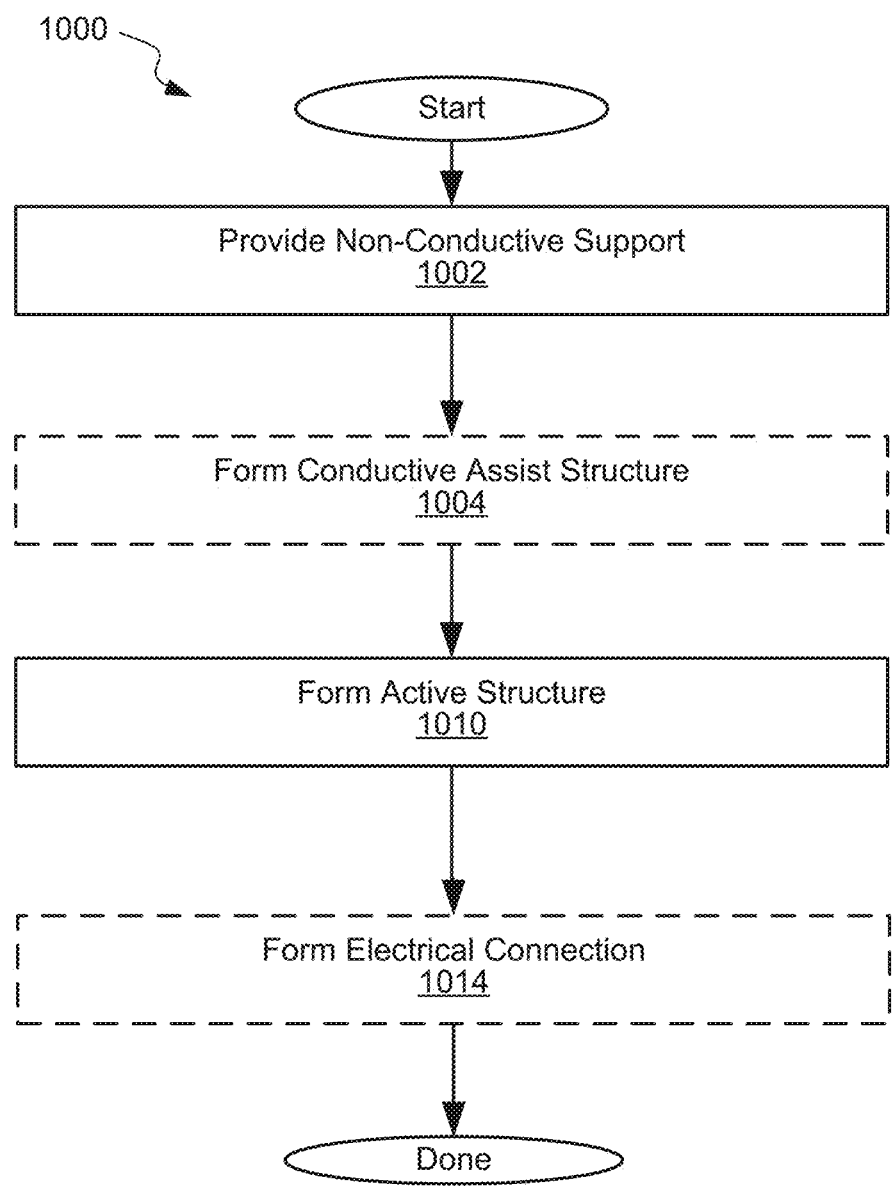
FIG. 10 is a process flowchart corresponding to a method of forming an electrode of a liquid treatment system, in accordance with some embodiments.

FIG. 10 is a process flowchart corresponding to a method 1000 of forming an electrode of a liquid treatment system, in accordance with some embodiments.

the method 1000 comprising: providing a non-conductive support (block 1002); forming an active structure (block 1010) on the non-conductive support wherein the active structure mechanically supported by the non-conductive support, and wherein the active structure comprises an active material for electrolytic removal of one or more contaminants from a liquid contacting the electrode.

In order to provide an electronic path for the charges on the electrodes, prior to forming the active structure (block 1010) on the non-conductive support, a conductive assist structure on the non-conductive support is formed (block 1004) such that the conductive assist structure is disposed between the non-conductive support and the active structure, wherein the conductive assist structure has a conductivity higher than a conductivity of the active structure and higher than a conductivity of the non-conductive support.

The conductive assist structure can be applied by various techniques including, but not limited to, physical coating techniques including micro gravure and slot die, spin-coating and spray coating, and physical or chemical vapor deposition.

An electrical connection for an electrical tab or bus bar to the conductive assist structure, can be formed (block 1014) by crimping, clamping, staking, welding, press fitting or gluing using a conductive adhesive.

Examples of Operating Liquid Treatment Systems

Figure 11:
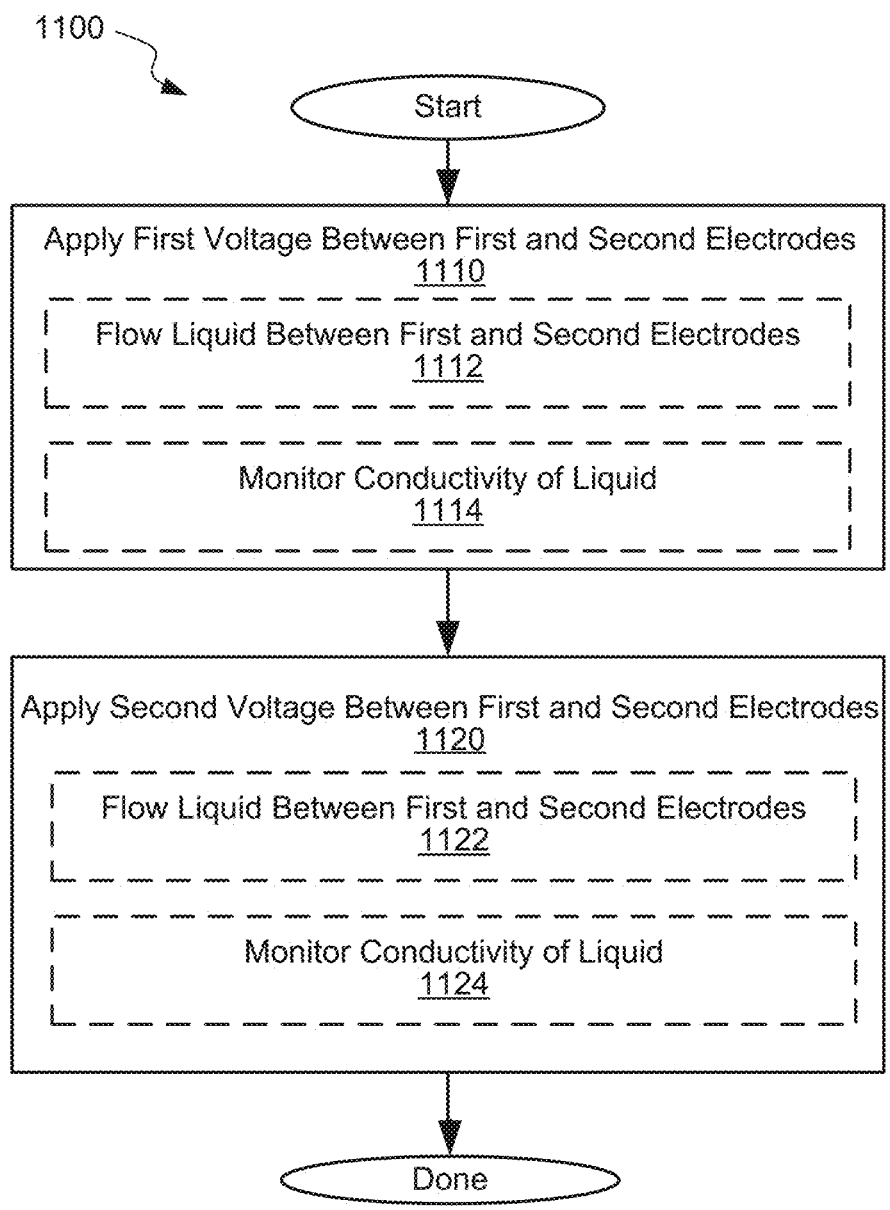
FIG. 11 is a process flowchart corresponding to a method of operating a liquid treatment system, in accordance with some embodiments.

FIG. 11 is a process flowchart corresponding to a method 1100 of operating a liquid treatment system, in accordance with some embodiments.

A first voltage potential is applied between a first electrode and a second electrode (block 1110) while the first electrode and the second electrode are in contact with a first liquid, wherein the first electrode comprises a non-conductive support and a first active structure mechanically supported by the non-conductive support, and wherein the second electrode is disposed adjacent to the first electrode and electronically isolated from the first electrode, wherein the second electrode comprises a non-conductive support and a second active structure mechanically supported by the non-conductive support. Conductive assist structures can be used between the active structure and the non-conductive support.

The first voltage potential applied electrolytically removes one or more ionic contaminants from the first liquid contacting the first electrode and the second electrode and deposits these one or more contaminants on the first electrode and the second electrodes. The conductivity of the first liquid discharged from the liquid treatment system is monitored (block 1114). When the conductivity reaches a set value, denoting the point at which the contaminant ions are no longer being removed from the first liquid in sufficient quantity, the system needs to be regenerated by flowing the first liquid between the first and second electrodes (block 1112), wherein the contaminant ions are released from the first electrode and the second electrode into a second liquid.

When the conductivity reaches the set level, a second voltage potential (block 1120) is applied between the first electrode and the second electrode while the first electrode and the second electrode are in contact with a second liquid different from the first liquid wherein the second voltage potential has an opposite polarity than the first voltage potential, or a zero voltage and by applying the second voltage potential electrolytically removes the one or more contaminants from the first electrode and the second electrode into the second liquid.

The conductivity of the second liquid discharged from the liquid treatment system is monitored (block 1124). When the conductivity reaches a set value, the number of contaminant ions being released has decreased below the level for acceptable liquid purity, the system is ready for the next deionization cycle, wherein the contaminant ions are electrolytically removed by the first electrode and the second electrode from more of the original first liquid. The second liquid is flown between the first and second electrodes (block 1122).

The second liquid may be the first liquid and if so would preferably flow at a lesser rate than the first liquid to minimize the volume of the second liquid, a waste product of the liquid treatment system. The second liquid may also be collected from a previous second liquid discharge, where the next regeneration simply increases its level of contaminant ions. In general, the second liquid flow rate and time, equivalent to volume, would be less than that of the first liquid flow rate and time, equivalent to volume.

The application of the first voltage potential can also be accomplished using a constant current to the maximum first voltage potential and may include a constant voltage mode where the current tapers off while maintaining constant voltage. The application of the second voltage potential can also be accomplished using a constant current to the maximum second voltage potential and may include a constant voltage mode where the current tapers off while maintaining the second voltage potential. The second voltage potential can be zero volts obtained by short circuit of the system, but this method may not allow the effective recapture of the charge energy exerted in the first deionization cycle. For this reason, the charging the terminals in the opposite direction, similar to discharging a symmetrical supercapacitor may provide for better round-trip charge efficiency.

Experimental Data

Early test results compare the conductivity of a non-conductive PET film and conductive Al foil substrates coated with different conductive additives and active material formulations. The active material coatings were approx. 100 microns and the SWCNT coating was approx. 2 microns. The resistance measurements are taken with an ohmmeter with probes contacting the surface 50 mm apart.

| Substrate | Conductive Assist Structure | % active in Active Structure | % conductive in Active Structure | Resistance (Ohm) |
|---|---|---|---|---|
| Al foil | — | 85.0 | 8.0 | 13-15 |
| PET film | — | — | — | Infinite |
| PET film | SWCNT coating | — | — | 300 |
| PET film | — | 85.0 | 8.0 | 700 |
| PET film | — | 80.0 | 17.0 | 160 |

Al foil has the lowest surface resistance. Using the same active carbon material (from Mead WestVaco) in the slurry the resistance increased from 13-15 Ohms to 700 Ohms when coated on a non-conductive PET film. The PET film when coated with a very thin 2 micron layer of SWCNT exhibited lower resistance than PET film which had infinite resistance. Other formulations showed conductivity but were less conductive than if coated onto Al foil. The important information in this early work is that it is possible to provide electronic conductivity on an infinite resistance substrate using conductive additives or coatings.

Figure 12A:
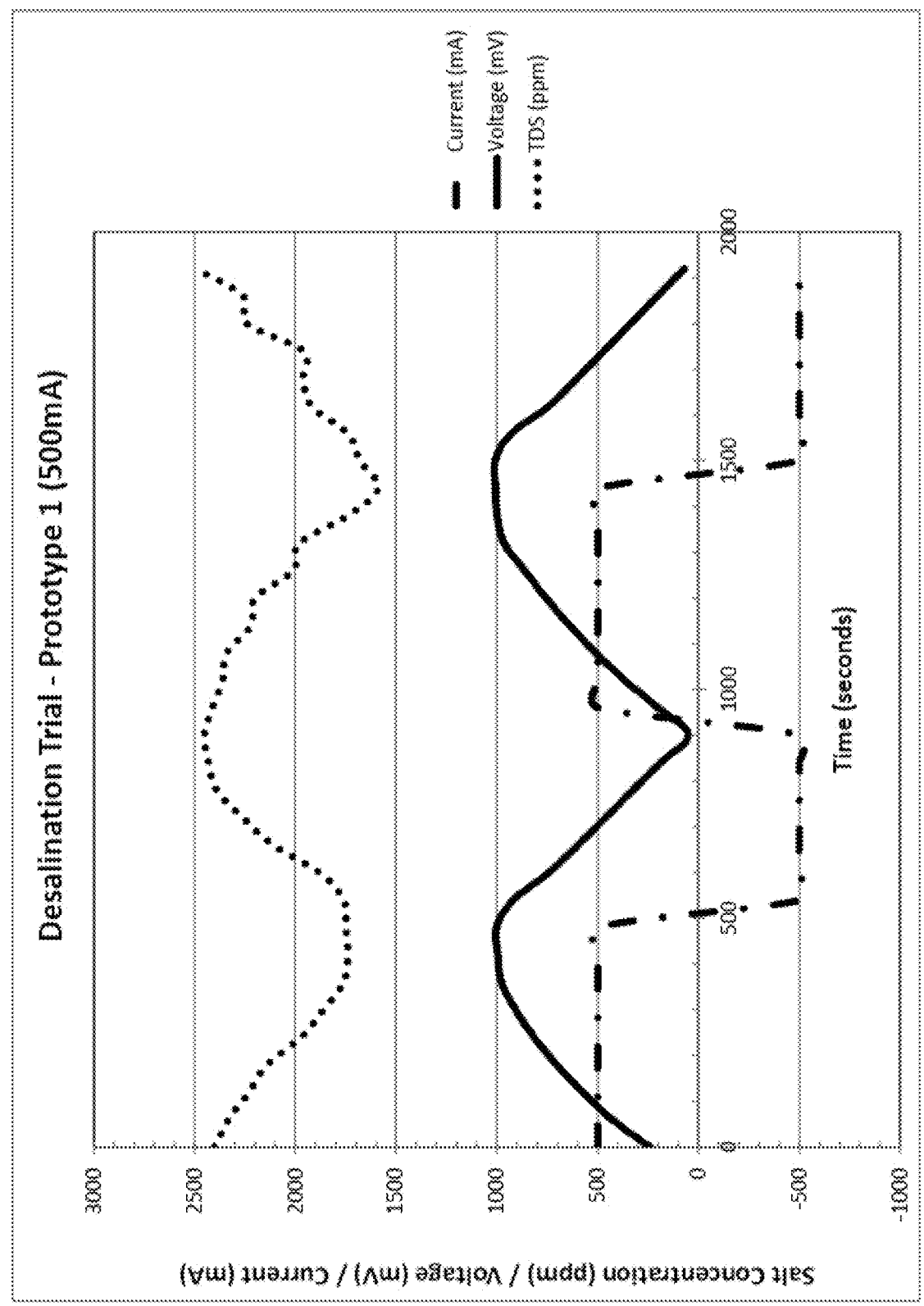
FIGS. 12A and 12B present experimental result of testing a liquid treatment system.
Figure 12B:
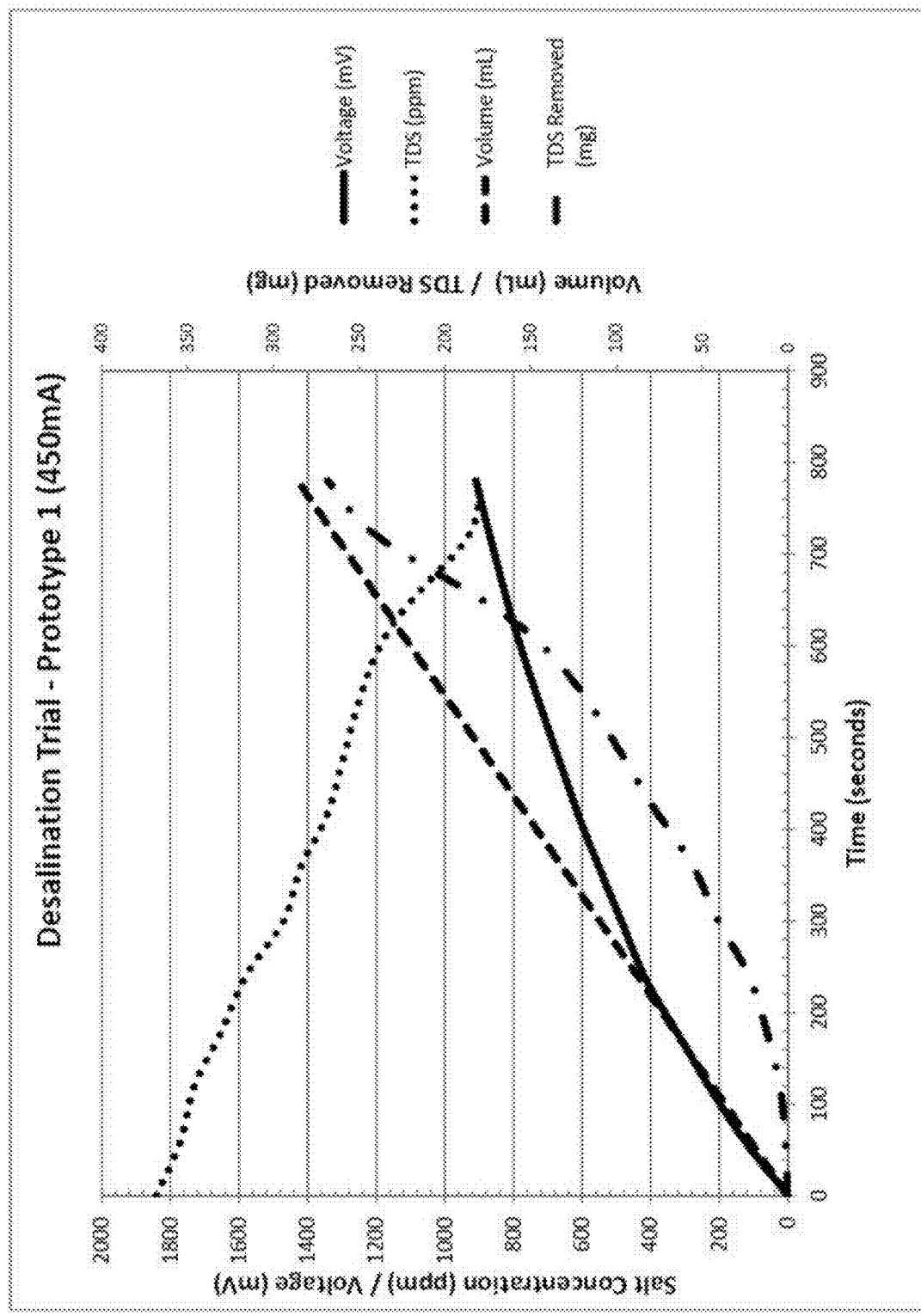

Desalination test results are presented in FIGS. 12A and 12B. A cylindrical ultracapacitor cell using two symmetrical activated carbon electrodes and two separator sheets was wound into a jelly roll and assembled with the inner dimensions of 15 cm length×2.5 cm diameter. A sodium chloride solution of 2400 ppm was flowed through the cell along the axis of the wound jelly roll. FIG. 12A highlights two consecutive desalination/regeneration cycles. A constant current of 500 mA was used and the cell was cycled between 0.1V and 1.0V. During the charge the sodium chloride solution measured at the output of the cell was reduced to 1600 ppm. The cell was regenerated with a discharge with the output solution reaching the original 2400 ppm and followed by a second continuous charge/discharge cycle. FIG. 12B shows a separate test with a sodium chloride solution of 1840 ppm. In this test the cell was charged from 0.0V to 0.9V at 450 mA. The salt concentration was reduced from 1840 ppm to 901 ppm. With a flow rate of 22 mL/min, 268 mg of salt was removed.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A liquid treatment system comprising:
a first electrode, wherein:
the first electrode comprises a first non-conductive support and a first active structure,
the first non-conductive support mechanically supports the first active structure,
the first electrode further comprises a first conductive assist structure having a conductivity higher than a conductivity of the first active structure and a conductivity of the first non-conductive support,
the first conductive assist structure is disposed between the first active structure and the first non-conductive support, and
the first active structure comprises a first active material operable to electrolytically remove of one or more contaminants from a liquid contacting the first electrode; and
a second electrode disposed adjacent to the first electrode and electronically isolated from the first electrode, wherein:
the second electrode comprises a second non-conductive support and a second active structure,
the second non-conductive support mechanically supports the second active structure,
the second electrode further comprises a second conductive assist structure having a conductivity higher than a conductivity of the second active structure and a conductivity of the second non-conductive support,
the second conductive assist structure is disposed between the second active structure and the second non-conductive support, and
the second active structure comprises a second active material operable to electrolytically remove one or more additional contaminants from the liquid contacting the second electrode;
the first conductive assist structure or the second conductive assist structure comprises one of nickel, titanium, copper, chromium, stainless steel, gold, tantalum, niobium, hafnium, zirconium, vanadium, indium, cobalt, tungsten, a carbon nanotube, a conductive carbon, carbon black, graphene, a conductive adhesive, a conductive polymer, or a combination thereof; and
an ionic exchange membrane.

2. The liquid treatment system of claim 1, wherein the first conductive assist structure or the second conductive assist structure is a layer having an average thickness of between about 1 micrometer and 10 micrometers.

3. The liquid treatment system of claim 1, wherein the first non-conductive support comprises one of polyethylene terephthalate (PET), biaxially-oriented PET (BoPET), poly(butylene terephthalate) (PBT) poly(trimethylene terephthalate) (PTT), poly(ethylene naphthalate) (PEN), poly(glycolic acid) (PGA), poly(actic acid) (PLA), polycaprolactone (PCL), polyhydroxyalkanoate (PHA), poly(3-hydroxybutyrate) (PHB), poly(ethylene adipate) (PEA), poly(butylene succinate) (PBS), or cellophane.

4. The liquid treatment system of claim 1, wherein the first electrode and the second electrode form a jellyroll or a stack, the jellyroll or the stack comprising a torturous path for the liquid flowing through the liquid treatment system.

5. The liquid treatment system of claim 1, wherein each of the first active structure and the second active structure comprises an activated carbon.

6. The liquid treatment system of claim 1, wherein the first non-conductive support and the second non-conductive support have substantially same compositions.

7. The liquid treatment system of claim 1, wherein the liquid treatment system is one of a water desalination system, a water softener, or a water purifier.

8. The liquid treatment system of claim 1, wherein the one or more contaminants comprises of sodium ions, chloride ions, calcium ions, magnesium ions, carbonate ions, ammonium ions, nitrate ions, chromate ions, sulphate ions, sulphonate ions, phosphate ions, aluminum ions, arsenic ions, iron ions and other heavy metal ions.

9. An assembly for a liquid treatment system, the assembly comprising:
an electrode, comprising:
a non-conductive support;
an active structure, mechanically supported by the non-conductive support,
wherein the active structure comprises an active carbon for electrolytic removal of one or more contaminants from a liquid contacting the electrode; and
a conductive assist structure, disposed between the active structure and the non-conductive support,
wherein the conductive assist structure has a conductivity higher than the conductivity of the active structure and the conductivity of the non-conductive support; and
an ionic exchange membrane.

10. The assembly of claim 9, wherein the conductive assist structure comprises one of nickel, titanium, copper, chromium, stainless steel, gold, tantalum, niobium, hafnium, zirconium, vanadium, indium, cobalt, tungsten or a combination thereof, a carbon nanotube, a conductive carbon, carbon black, graphene, a conductive adhesive, or a conductive polymer.

11. The assembly of claim 9, wherein the conductive assist structure is a layer having an average thickness of between about 1 micrometer and 10 micrometers.

12. The assembly of claim 9, wherein the non-conductive support comprises one of polyethylene terephthalate (PET), biaxially-oriented PET (BoPET), poly(butylene terephthalate) (PBT) poly(trimethylene terephthalate) (PTT), poly(ethylene naphthalate) (PEN), poly(glycolic acid) (PGA), poly(actic acid) (PLA), polycaprolactone (PCL), polyhydroxyalkanoate (PHA), poly(3-hydroxybutyrate) (PHB), poly(ethylene adipate) (PEA), poly(butylene succinate) (PBS), or cellophane.

13. A method of forming an electrode of a liquid treatment system, the method comprising:
providing a non-conductive support; and
forming a conductive assist structure on the non-conductive support, wherein forming the conductive assist structure comprises one of micro gravure, slot die, spin-coating, spray coating, or physical or chemical vapor deposition;
forming an electrical connection to the conductive assist structure, wherein forming the electrical connection comprises crimping, staking, welding, press fitting or gluing using a conductive adhesive; and forming an active structure on the conductive assist structure, such that the conductive assist structure is disposed between the non-conductive support and the active structure, wherein:

the non-conductive support mechanically supports the conductive assist structure and the active structure, the conductive assist structure has a conductivity higher than the conductivity of the active structure and higher than the conductivity of the non-conductive support, and the active structure comprises an active material operable to electrolytically remove one or more contaminants from a liquid contacting the electrode.

14. The method of claim 13, wherein forming the active structure on the non-conductive support comprises one of doctor blade coating, micro gravure, reverse application roller with comma blade, slot die, spray coating, or physical or chemical vapor deposition.

15. The method of claim 13, wherein the conductive assist structure comprises one of nickel, titanium, copper, chromium, stainless steel, gold, tantalum, niobium, hafnium, zirconium, vanadium, indium, cobalt, tungsten or a combination thereof, a carbon nanotube, a conductive carbon, carbon black, graphene, a conductive adhesive, or a conductive polymer.

16. The method of claim 13, wherein the non-conductive support comprises one of polyethylene terephthalate (PET), biaxially-oriented PET (BoPET), poly(butylene terephthalate) (PBT) poly(trimethylene terephthalate) (PTT), poly(ethylene naphthalate) (PEN), poly(glycolic acid) (PGA), poly(actic acid) (PLA), polycaprolactone (PCL), polyhydroxyalkanoate (PHA), poly(3-hydroxybutyrate) (PHB), poly(ethylene adipate) (PEA), poly(butylene succinate) (PBS), or cellophane.

17. The method of claim 13, wherein the conductive assist structure is a layer having an average thickness of between about 1 micrometer and 10 micrometers.

* * * * *